US011606662B2

(12) United States Patent
Raghuvanshi

(10) Patent No.: US 11,606,662 B2
(45) Date of Patent: Mar. 14, 2023

(54) MODELING ACOUSTIC EFFECTS OF SCENES WITH DYNAMIC PORTALS

(71) Applicant: Microsoft Technology Licensing, LLC, Redmond, WA (US)

(72) Inventor: Nikunj Raghuvanshi, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/307,694

(22) Filed: May 4, 2021

(65) Prior Publication Data

US 2022/0377485 A1  Nov. 24, 2022

(51) Int. Cl.
*H04S 7/00* (2006.01)
*G06F 3/01* (2006.01)

(52) U.S. Cl.
CPC .............. *H04S 7/303* (2013.01); *G06F 3/011* (2013.01); *H04S 2400/11* (2013.01); *H04S 2420/01* (2013.01)

(58) Field of Classification Search
None
See application file for complete search history.

(56) References Cited

U.S. PATENT DOCUMENTS

| 6,973,192 | B1 | 12/2005 | Gerrard et al. | |
| 9,922,463 | B2* | 3/2018 | Lanier | G06T 11/60 |
| 10,602,298 | B2 | 3/2020 | Raghuvanshi et al. | |
| 10,735,885 | B1* | 8/2020 | Blewett | H04R 5/04 |
| 2011/0081023 | A1* | 4/2011 | Raghuvanshi | H04S 7/30 381/17 |
| 2018/0359591 | A1 | 12/2018 | Bygrave | |
| 2019/0356999 | A1* | 11/2019 | Raghuvanshi | H04S 7/304 |

OTHER PUBLICATIONS

Cao, et al., "Interactive Sound Propagation with Bidirectional Path Tracing", In Journal of ACM Transactions on Graphics, vol. 35, No. 6, Nov. 2016, 11 Pages.

Chaitanya, et al., "Adaptive Sampling for Sound Propagation", In Journal of IEEE Transactions on Visualization and Computer Graphics, vol. 25, Issue 5, May 2019, pp. 1846-1854.

Chaitanya, et al., "Directional Sources and Listeners in Interactive Sound Propagation using Reciprocal Wave Field Coding", In Journal of ACM Transactions on Graphics, vol. 39, No. 4, Jul. 2020, 14 Pages.

(Continued)

Primary Examiner — Qin Zhu
(74) Attorney, Agent, or Firm — Rainier Patents, P.S.

(57) ABSTRACT

The description relates to modeling acoustic effects in scenes with dynamic portals. One implementation includes obtaining a representation of a scene having a plurality of portals and simulating sound travel in the scene using a plurality of probes deployed in the scene. The implementation also includes determining acoustic parameters for initial sound traveling between respective probes based at least on the simulating. The implementation also includes identifying one or more intercepted portals in the scene that are intercepted by a particular initial sound path from a particular source location to a particular listener location, using particular acoustic parameters for the particular source location and the particular listener location.

20 Claims, 15 Drawing Sheets

(56) References Cited

OTHER PUBLICATIONS

Schroder, Dirk, "Physically Based Real-Time Auralization of Interactive Virtual Environments", In Publication of Logos Verlag Berlin, 2011, 231 Pages.

Godin, et al., "Wave Acoustics in a Mixed Reality Shell", In Proceedings of AES International Conference on Audio for Virtual and Augmented Reality, Aug. 20, 2018, 08 Pages.

Litovsky, et al., "The Precedence Effect", In The Journal of the Acoustical Society of America, vol. 106, Issue 4, Oct. 1999, pp. 1633-1654.

Mehra, et al., "Wave-Based Sound Propagation in Large Open Scenes Using an Equivalent Source Formulation", In Journal of ACM transactions on Graphics, vol. 32, Issue 2, Apr. 30, 2013, 13 Pages.

Raghuvanshi, et al., "Efficient and Accurate Sound Propagation Using Adaptive Rectangular Decomposition", In Journal of the IEEE Transactions on Visualization and Computer Graphics, vol. 15, Issue 5, Sep. 2009, pp. 789-801.

Raghuvanshi, et al., "Parametric Directional Coding for Precomputed Sound Propagation", In Journal of ACM Transactions on Graphics, vol. 37, No. 4, Aug. 2018, 14 Pages.

Raghuvanshi, et al., "Parametric Wave Field Coding for Precomputed Sound Propagation", In Journal of ACM Transactions on Graphics, vol. 33, No. 4, Jul. 27, 2014, 11 Pages.

Raghuvanshi, et al., "Triton: Practical precomputed sound propagation for games and virtual reality", In The Journal of the Acoustical Society of America vol. 141, Issue 5, May 2017, 02 Pages.

Rosen, et al., "Interactive Sound Propagation for Dynamic Scenes using 2d Wave Simulation", In Journal of Computer Graphics Forum, vol. 39, No. 8, Dec. 2020, pp. 39-46.

Rungta, et al., "Diffraction Kernels for Interactive Sound Propagation in Dynamic Environments", In Journal of IEEE Transactions on Visualization and Computer Graphics, vol. 24, Issue 4, Apr. 2018, pp. 1613-1622.

Savioja, et al., "Overview of Geometrical Room Acoustic Modeling Techniques", In Journal of the Acoustical Society of America vol. 138, Issue 2, Aug. 10, 2015, pp. 708-730.

Stavrakis, et al., "Topological Sound Propagation with Reverberation Graphs", In Journal of Acta Acustica united with Acustica, vol. 94, No. 6, 2008, 11 Pages.

Tsingos, et al., "Instant Sound Scattering", In Proceedings of Eurographics Symposium on Rendering, Jun. 25, 2007, 10 Pages.

Tsingos, et al., "Soundtracks for Computer Animation : Sound Rendering in Dynamic Environments with Occlusions", In Proceedings of the Graphics Interface Conference, May 21, 1997, 08 pages.

"Steam Audio", Retrieved from: https://valvesoftware.github.io/steam-audio, Retrieved Date: Mar. 24, 2021, 11 Pages.

"International Search Report and Written Opinion Issued in PCT Application No. PCT/US22/024131", dated Jul. 18, 2022, 12 Pages.

* cited by examiner

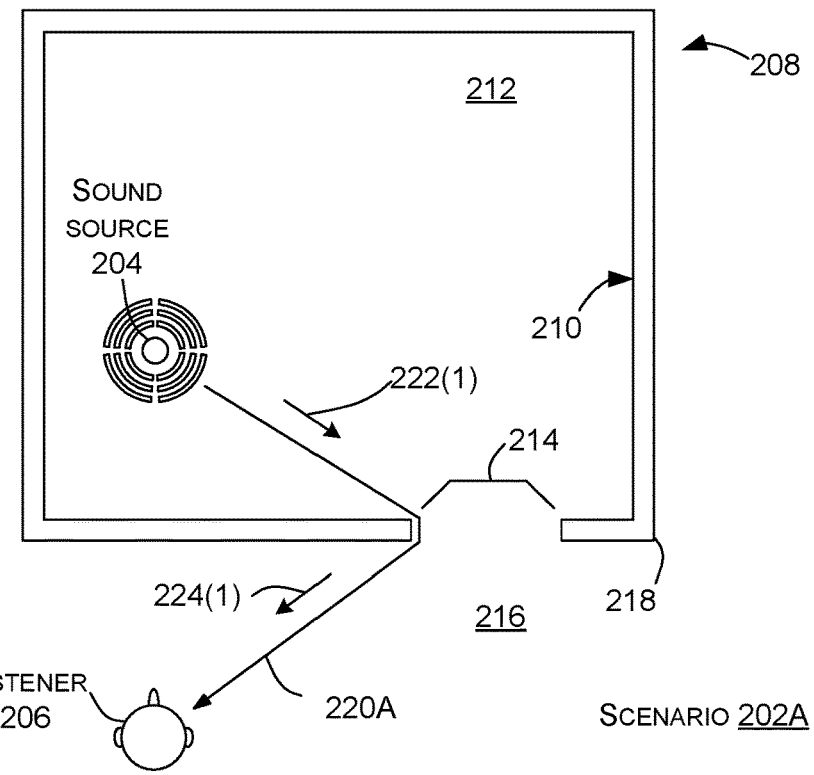
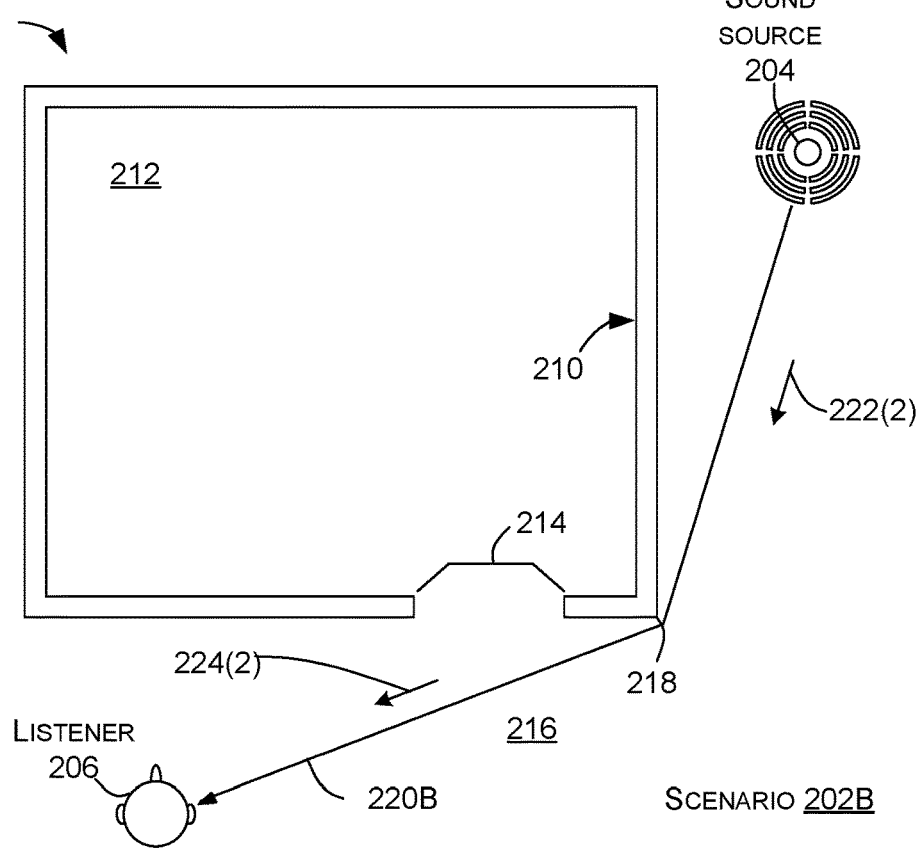

METHOD 1600

MODELING ACOUSTIC EFFECTS OF SCENES WITH DYNAMIC PORTALS

BACKGROUND

Practical modeling and rendering of real-time acoustic effects (e.g., sound, audio) for video games and/or virtual reality applications can be prohibitively complex. For instance, conventional real-time path tracing methods demand enormous sampling to produce smooth results, greatly exceeding reasonable computational budgets, and do not model wave effects such as diffraction. Alternatively, precomputed wave-based techniques can be used to accurately represent acoustic parameters (e.g., loudness, reverberation level) of a scene at low runtime costs. However, these precomputed wave-based techniques have generally been limited to static virtual scenes. In practice, however, virtual scenes can change over time.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. In some cases, parentheticals are utilized after a reference number to distinguish like elements. Use of the reference number without the associated parenthetical is generic to the element. Further, the left-most numeral of each reference number conveys the FIG. and associated discussion where the reference number is first introduced.

FIGS. 2A and 2B illustrate scenarios related to propagation of initial sound, consistent with some implementations of the present concepts.

DETAILED DESCRIPTION

Sound Perception Overview

Figure 1:
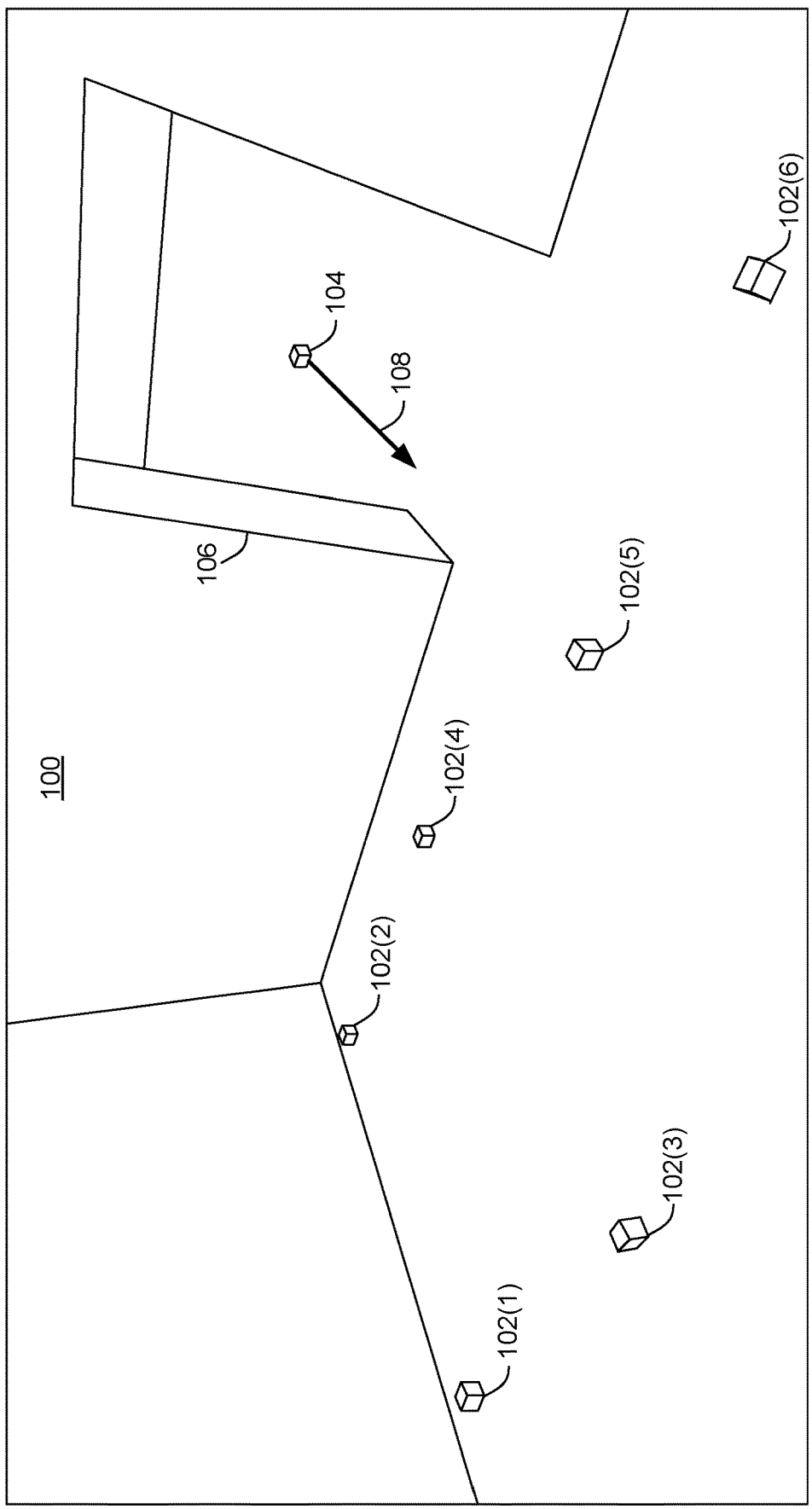
FIG. 1 illustrates a scenario of acoustic probes deployed in a virtual scene, consistent with some implementations of the present concepts.

The time at which sound waves are received by a listener conveys important information to the listener. For instance, for a given wave pulse introduced by a sound source into a scene, the pressure response or "impulse response" at the listener arrives as a series of peaks, each of which represents a different path that the sound takes from the source to the listener. Listeners tend to perceive the direction of the first-arriving peak in the impulse response as the arrival direction of the sound, even when nearly-simultaneous peaks arrive shortly thereafter from different directions. This is known as the "precedence effect." This initial sound takes the shortest path through the air from a sound source to a listener in a given scene. After the initial sound, subsequent reflections are received that generally take longer paths through the scene and become attenuated over time.

Thus, humans tend to perceive sound as an initial sound followed by reflections and then subsequent reverberations. As a result of the precedence effect, initial sounds tend to enable listeners to perceive where the sound is coming from, whereas reflections and/or reverberations tend to provide listeners with additional information about the scene because they convey how the impulse response travels along many different paths within the scene.

Furthermore, reflections can be perceived differently by the user depending on properties of the scene. For instance, when a sound source and listener are nearby (e.g., within footsteps), a delay between arrival of the initial sound and corresponding first reflections can become audible. The delay between the initial sound and the reflections can strengthen the perception of distance to walls.

Portal Influence on Sound Perception

In many applications, doors or other portals may be part of a scene and can open and close at runtime. In real life, listeners can perceive initial sounds propagating through a door as being increasingly attenuated as the door progressively closes. In addition, listeners can perceive a reduction in reflected sound energy from the direction of a door that is closing. The disclosed implementations provide efficient mechanisms for modeling similar effects in virtual scenes for both initial and reflected sound. For the purposes of this document, the term "dynamic portal" is construed broadly to mean any element of a scene that changes at runtime in a manner that influences sound propagation in the scene. Thus, dynamic portals can include doors, windows, walls or other structures that may be removed by simulated explosions, simulated natural phenomena, user actions, computer-controlled character actions, etc.

In many cases, sound can travel through multiple portals in a given scene. When the initial sound path between a sound source and a listener travels through several portals, the relative loudness of initial sound perceived by the listener is influenced by the state of each portal on the path, e.g., the extent to which the portals on the path intercepted by the initial sound path are open or closed.

As noted above, modeling and rendering of real-time acoustic effects can be very computationally intensive, and can become even more so when considering dynamic changes to portal state in a given scene. For instance, consider rendering acoustic effects in a video game with a large scene (e.g., 10 square kilometers and 100 portals), where multiple sound sources and/or listeners are moving in the scene while portals are opening and closing. At each frame, the sound sources and listeners can move and dynamic portals can change state. Thus, in some cases, acoustic effects are updated at visual frame rates to reflect changes to the sound source, listener, and dynamic portals. Ideally, the acoustic effects account for diffraction of sound by the dynamic portals as well as static structures in the scene, while varying smoothly in time and space so that the user does not perceive discontinuities.

One high-level approach for reducing the computational burden of rendering sound involves precomputing acoustic parameters characterizing how sound travels from different source locations to different listener locations in a given virtual scene. Once these acoustic parameters are precomputed, they are invariant provided that the scene does not change. However, while dynamic portals are part of the scene, they can change state at runtime and thus it is computationally intensive to precompute acoustic parameters for each plausible runtime portal state of each portal. Here, the term "precompute" is used to refer to determining acoustic parameters of a scene offline, while the term "runtime" refers to using those acoustic parameters during execution of an application to perform actions such as identifying intercepted portals and/or rendering sound to account for changes to source location, listener location, and/or portal state of the intercepted portals.

In theory, one could precompute acoustic parameters for a given scene with portals in both open and closed states, and then use interpolation techniques at runtime to handle intermediate states. However, in scenes with large numbers of portals, this becomes computationally intractable, because each potential combination of opened/closed states for each portal must be precomputed to account for the complex interactions between portals. This quickly becomes expensive, as a combinatorial number of parameter sets need to be precomputed, e.g., eight separate sets of parameters would be involved for only three portals. Furthermore, in practice, each portal does not necessarily affect the entirety of the scene, and precomputing multiple sets of parameters for even a single portal over an entire scene can be wasteful.

The disclosed implementations offer computationally efficient mechanisms for modeling and rendering of acoustic effects that account for changing portal state without requiring precomputation of the parameters for different portal states. Instead, the disclosed implementations identify intercepted portals on the shortest path from the source to the listener at runtime based on precomputed delay and direction parameters, as discussed more below. This allows for runtime adjustment of acoustic effects based on the extent to which the intercepted portals are open or closed.

To identify which portals are intercepted by a given sound path, the disclosed implementations can use acoustic parameters describing initial sound delays from source to listener locations in a scene. These acoustic parameters can be precomputed by simulating sound travel in a given scene with all portals fully open to allow sound energy to travel through the portals unimpeded, as described more below. Once these precomputed parameters have been obtained for a given scene as described herein, they can be used to identify any portals that fall along the shortest path from sources to listeners at any locations in the scene. Initial sound and/or reflections can then be rendered at the listener location by adjusting the sound to account for the open/closed state of the intercepted portals by modeling energy loss across each portal along the shortest path.

Probing

As noted previously, the disclosed implementations can precompute acoustic parameters of a scene and then use the precomputed information at runtime to identify any portals on the initial sound path from a source and a listener. Generally, these precomputed acoustic parameters can be considered "perceptual" parameters because they describe how sound is perceived by listeners in the scene depending on the location of the sound source and listener.

To determine the perceptual parameters for a given scene, acoustic probes can be deployed at various locations as described below. FIG. 1 shows an example of probing a scene 100. Individual probes 102(1)-102(6) are deployed throughout the scene at various locations where listeners can appear at runtime. In addition, another probe 104 is placed at the centroid of portal 106 for reasons discussed in more detail below. FIG. 1 also shows a normal vector 108 for the portal that is normal to a plane defined by the portal. As described more below, normal vector 108 can be used to confirm that sound paths travel through portal 106 at runtime.

In some implementations, simulations can be employed to model the travel of sound between selected locations in a given scene. For instance, sound sources can be deployed at given source locations and each probe can act as a listener at the corresponding probe location. This can be carried out for each combination of sound sources and listener probes in the scene, as described more below. For instance, wave simulations can be employed to model acoustic diffraction in the scene. The wave simulations can be used to determine how sound will be perceived by listeners at different locations in the scene depending on the location of the sound source. Then, perceptual acoustic parameters can be stored representing this information. For instance, the perceptual acoustic parameters can represent the delay of initial sound perceived at a given listener location when emitted from a particular source location, the loudness of the initial sound, the departure and/or arrival direction of the initial sound, the loudness of reflections arriving at the listener from different directions, and so on.

Initial Sound Propagation

As noted, each probe can be used to precompute acoustic parameters relating to different characteristics of how sound is perceived by a listener at the probed location, such as delay, loudness, and direction. FIGS. 2A and 2B are provided to introduce the reader to concepts relating to the travel of initial sound using a relatively simple scene 200. Subsequently, these concepts will be used to explain how acoustic parameters such as initial sound delay can be used to dynamically determine a set of portals that are intercepted by a sound path between an arbitrary source and listener location in a scene.

FIG. 2A illustrates a scenario 202A and FIG. 2B illustrates a scenario 202B, each of which conveys certain concepts relating to how initial sound emitted by a sound source 204 is perceived by a listener 206 based on acoustic properties of scene 200. For instance, scene 200 can have acoustic properties based on geometry 208, which can include structures such as walls 210 that form a room 212 with a portal 214 (e.g., doorway), an outside area 216, and at least one exterior corner 218. For reasons discussed elsewhere herein, the portal can be simulated as being fully open, and the acoustic parameters derived with the portal simulated as being fully open can later be employed to model sound through that portal fully opened, fully closed, or in any state therebetween.

As used herein, the term "geometry" can refer to an arrangement of structures (e.g., physical objects) and/or open spaces in a scene. Generally, the term "scene" is used herein to refer to any environment in which real or virtual sound can travel, and a "virtual" scene includes any scene with at least one virtual structure. In some implementations, structures such as walls can cause occlusion, reflection, diffraction, and/or scattering of sound, etc. Some additional examples of structures that can affect sound are furniture, floors, ceilings, vegetation, rocks, hills, ground, tunnels, fences, crowds, buildings, animals, stairs, etc. Additionally, shapes (e.g., edges, uneven surfaces), materials, and/or textures of structures can affect sound. Note that structures do not have to be solid objects. For instance, structures can include water, other liquids, and/or types of air quality that might affect sound and/or sound travel.

Generally, the sound source 204 can generate sound pulses that create corresponding impulse responses. The impulse responses depend on properties of the scene 200 as well as the locations of the sound source and listener. As discussed more below, the first-arriving peak in the impulse response is typically perceived by the listener 206 as an initial sound, and subsequent peaks in the impulse response tend to be perceived as reflections. FIGS. 2A and 2B convey how this initial peak tends to be perceived by the listener, and subsequent examples describe how the reflections are perceived by the listener. Note that this document adopts the convention that the top of the page faces north for the purposes of discussing directions.

A given sound pulse can result in many different sound wavefronts that propagate in all directions from the source. For simplicity, FIG. 2A shows a single such wavefront, initial sound wavefront 220A, that is perceived by listener 206 as the first-arriving sound. Because of the acoustic properties of scene 200 and the respective positions of the sound source and the listener, the listener perceives initial sound wavefront 220A as arriving from the northeast. For instance, in a virtual reality world based on scenario 202A, a person (e.g., listener) looking at a wall with a doorway to their right would likely expect to hear a sound coming from their right side, as walls 210 attenuate the sound energy that travels directly along the line of sight between the sound source 204 and the listener 206. In general, the concepts disclosed herein can be used for rendering initial sound with realistic directionality, such as coming from the doorway in this instance.

In some cases, the sound source 204 can be mobile. For example, scenario 202B depicts the sound source 204 in a different location than scenario 202A. In scenario 202B, both the sound source 204 and listener are in outside area 216, but the sound source is around the exterior corner 218 from the listener 206. Once again, the walls 210 obstruct a line of sight between the listener and the sound source. Thus, in this example, the listener perceives initial sound wavefront 220B as the first-arriving sound coming from the northeast.

The directionality of sound wavefronts can be represented using arrival direction indicators that indicate the direction from which sound energy arrives at the listener 206. For instance, referring back to FIG. 2A, note that initial sound wavefront 220A leaves the sound source 204 in a generally southeast direction as conveyed by departure direction indicator 222(1), and arrives at the listener 206 from a generally northeast direction as conveyed by arrival direction indicator 224(1). Likewise, considering FIG. 2B, initial sound wavefront 220B leaves the sound source in a south-southwest direction as conveyed by departure direction indicator 222(2) and arrives at the listener from an east-northeast direction as conveyed by arrival direction indicator 224(2).

Initial Sound Encoding

Consider a pair of source and listener locations in a given scene, with a sound source located at the source location and a listener located at the listener location. The direction of initial sound perceived by the listener is generally a function of acoustic properties of the scene as well as the location of the source and listener. Thus, the first sound wavefront perceived by the listener will generally leave the source in a particular direction and arrive at the listener in a particular direction. As a consequence, it is possible to encode arrival direction parameters for initial sounds in a scene for each sound source location and probed listener location. As will be discussed more below, the arrival direction of initial sound is another acoustic parameter that can be employed to identify particular portals in a scene that are intercepted by sound traveling along a path from a source to a listener.

Figure 3:
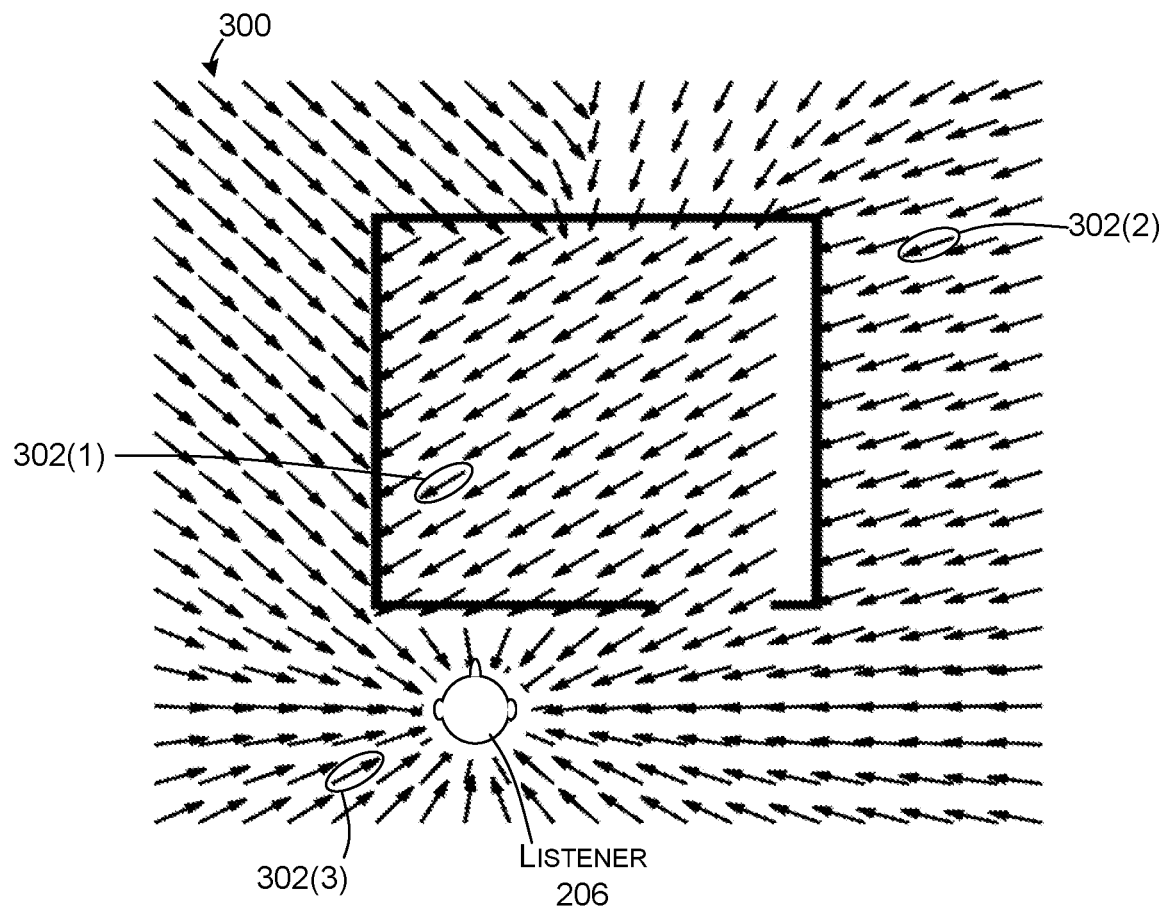
FIG. 3 illustrates an example of a field of arrival direction indicators, consistent with some implementations of the present concepts.

One way to represent the arrival directions of initial sound in a given scene is to use a field. FIG. 3 depicts an arrival direction field 300 for scene 200 (FIGS. 2A and 2B) with respect to the probed location of listener 206. The arrival direction field includes many arrival direction indicators 302, each of which is located at a probed source location from which a source can emit sounds. Each individual arrival direction indicator conveys that initial sound emitted from the corresponding source location is received at the probed listener location in the direction indicated by that arrival direction indicator.

Note that each of these fields can represent a horizontal "slice" within a given scene. Thus, different arrival direction fields can be generated for different vertical heights within a scene to create a volumetric representation of initial sound directionality for the scene with respect to the listener location.

As discussed more below, different arrival direction fields and/or volumetric representations can be generated for different potential listener locations a given scene to provide a relatively compact representation of initial sound arrival directionality. Each arrival direction indicator can represent an encoded arrival direction parameter for that specific source/location pair. Generally, the relative density of each encoded field can be a configurable parameter that varies based on various criteria, where denser fields can be used to obtain more accurate directionality and sparser fields can be employed to obtain computational efficiency and/or more compact representations.

Similar fields can be used to represent other information for each pair of source and listener locations. For instance, initial sound delays for each pair of source and listener locations can be represented as another field, where each entry in the field represents a given delay of initial sound from a source location to a listener location. As another example, initial sound loudness as well as directional reflection loudness can also be represented using fields obtained by probing and simulating a given scene as described elsewhere herein.

Portal Example

The following examples show how precomputed acoustic parameters can be employed to determine a set of portals in a scene that are intercepted by a sound path from a sound source to a listener. Generally, the disclosed implementations model the initial sound path as invariant with respect to portal state. In other words, initial sound from a source to a listener takes the same path irrespective of whether the portals in the scene are fully open, fully closed, or somewhere in between the open and closed states. Instead, the disclosed implementations model portals as being relatively less transmissive as they become more fully closed, but still allowing initial sound to propagate through when fully closed so that the initial sound path remains the same. As will be explained more fully below, this allows the disclosed implementations to use acoustic parameters that are precomputed while simulating fully open portals to model runtime changes to portal state.

Figure 4:
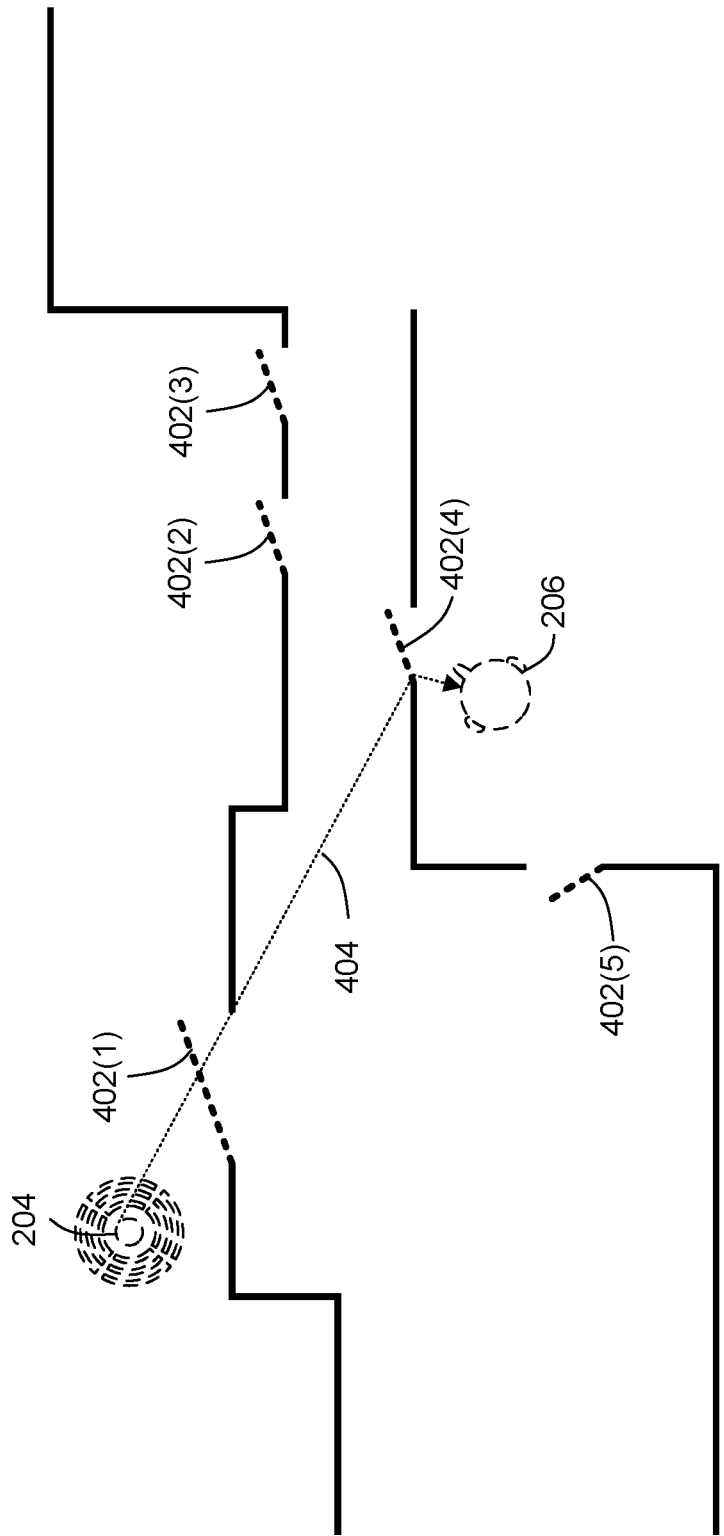
FIG. 4-8 illustrate scenarios related to propagation of sound through portals in scene, consistent with some implementations of the present concepts.

FIG. 4 shows a scene 400 with five portals, 402(1), 402(2), 402(3), 402(4), and 402(5). Here, the initial sound path 404 from sound source 204 to listener 206 travels through portals 402(1) and 402(4). As described more below, the disclosed implementations can use precomputed acoustic parameters to determine that the initial sound path between the source and listener intercepts portals 402(1) and 402(4) and does not intercept portals 402(2), (3), and (5).

Figure 5:
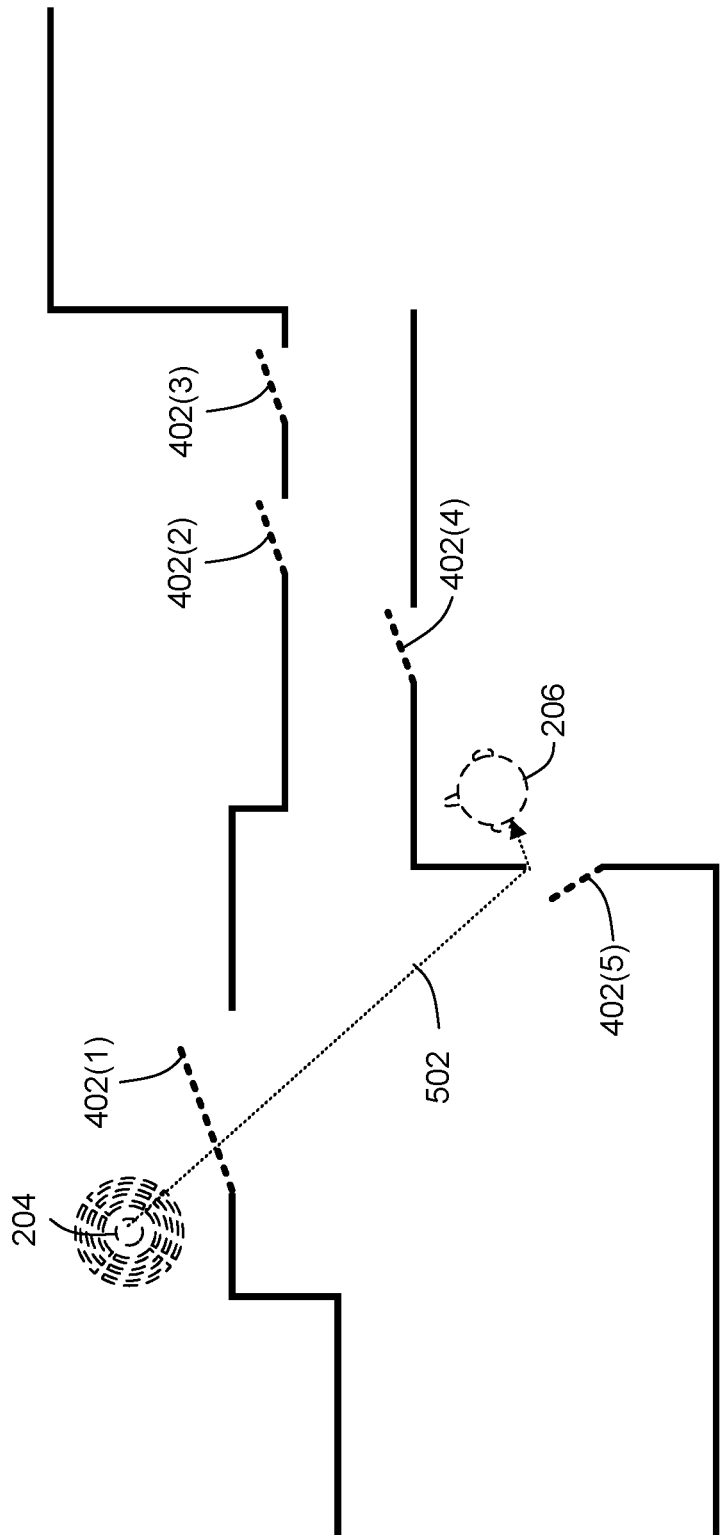

FIG. 5 shows scene 400 with the listener having moved to a different location. Now, the initial sound path 502 travels through portals 402(1) and 402(5). Using precomputed acoustic parameters, the disclosed implementations can infer that the initial sound path no longer intercepts portal 402(4), and instead intercepts portal 402(5). As noted previously, the disclosed implementations can be employed to model the changes that the listener will perceive based on state of portals intercepted by the initial sound path from a sound source. To do so, the disclosed implementations provide techniques for identifying which portals are intercepted by the initial sound path between a given source location and listener location in the scene.

Figure 6:
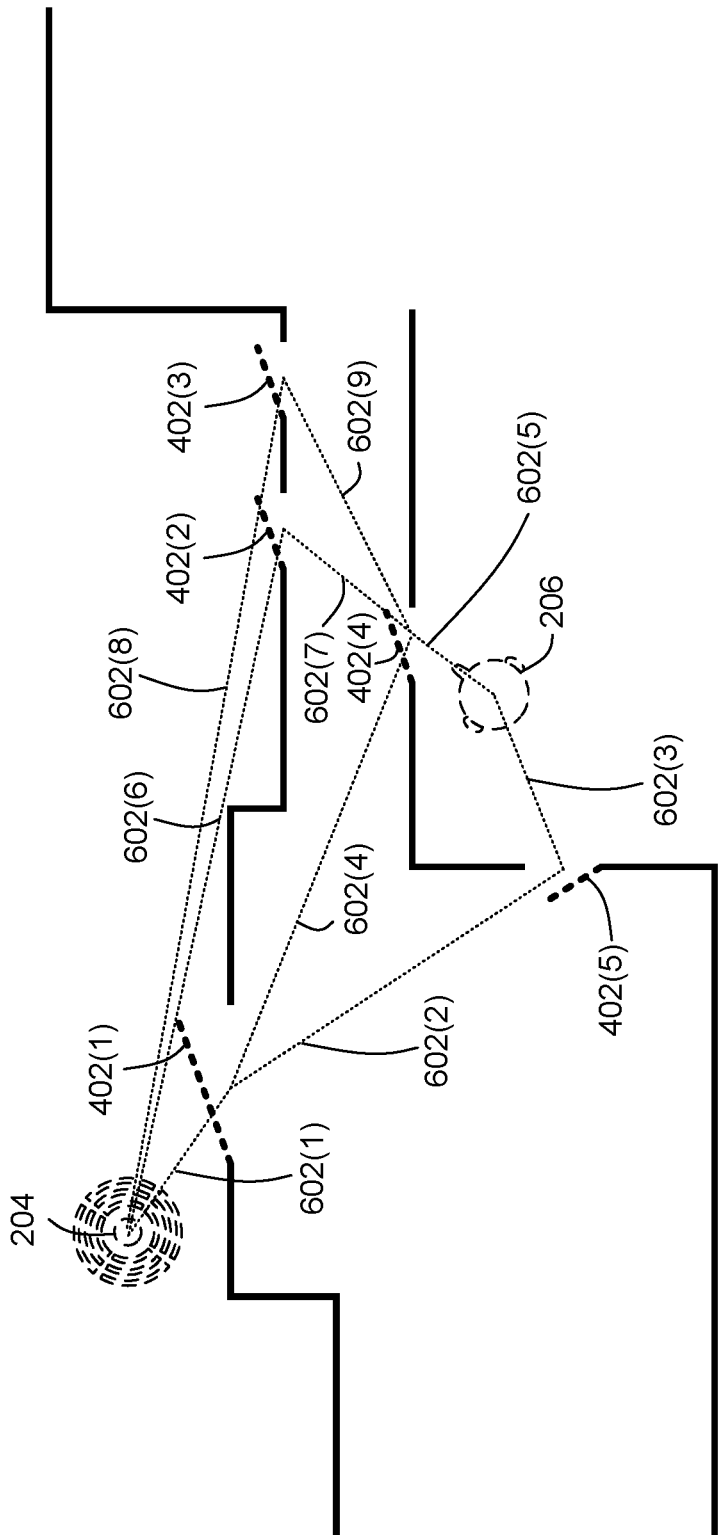

FIG. 6 illustrates how precomputed information can be used to determine that portals 402(1) and 402(4) are on the initial sound path in FIG. 4. Recall first that the precomputed acoustic parameters for a given scene generally include the initial sound delay and arrival direction, but not the full path that initial sound travels from a given sound source location to a corresponding listener location. Nevertheless, because the initial sound delay represents a corresponding real-world distance that the sound travels, geometric techniques can be employed to infer which portals in the scene that initial sound must have traveled through, as described more below.

Recall from above that the initial sound delay can be precomputed between any pair of probed locations. In FIG. 6, each line segment 602(1)-(9) represents the delay of initial sound between a pair of locations. Thus, for instance, segment 602(1) represents initial sound delay from sound source 204 to the centroid of portal 402(1). Segment 602(2) represents the initial sound delay from the centroid of portal 402(1) to the centroid of portal 402(5). Segment 602(3) represents the initial sound delay from the centroid of portal 402(5) to the listener 206. Segment 602(4) represents the initial sound delay from the centroid of portal 402(1) to the centroid of portal 402(4). Segment 602(5) represents the initial sound delay from the centroid of portal 402(4) to the listener 206. Segment 602(6) represents the initial sound delay from the sound source 204 to the centroid of portal 402(2). Segment 602(7) represents the initial sound delay from the centroid of portal 402(2) to the centroid of portal 402(4). Segment 602(8) represents the initial sound delay from the sound source 204 to the centroid of portal 402(3). Segment 602(9) represents the initial sound delay from the centroid of portal 402(3) to the centroid of portal 402(4).

Referring back to FIG. 4, assume that initial sound path 404 is 30 meters long. Now, referring back to FIG. 6, consider four potential paths to from the source the listener as follows. Assume that the total length of a first path having segments 602(1), 602(2), and 602(3) is 36 meters long, the total length of a second path having segments 602(1), 602(4), and 602(5) is 33 meters long, the total length of a third path having segments of 602(6), 602(7), and 602(5) is 40 meters long, and the total length of a fourth path having segments 602(8), 602(9), and 602(5) is 45 meters long.

Intuitively, one can see that initial sound path 404 having a length of 30 meters is closest to the total length of the segments passing through portals 402(1) and 402(4)—segments 602(1), 602(4), and 602(5), which total 33 meters. However, the initial sound path is somewhat shorter because the segments go through the centroids of the respective portals, whereas the initial sound path is not restricted to doing so and in fact crosses at the westmost edge of portal 402(4). Mathematical formulations described below provide a basis for determining that the initial sound path 404 intercepts portals 402(1) and 402(4) based on the initial sound path length being approximately the same as the total length of the segments through these portals.

Figure 7:
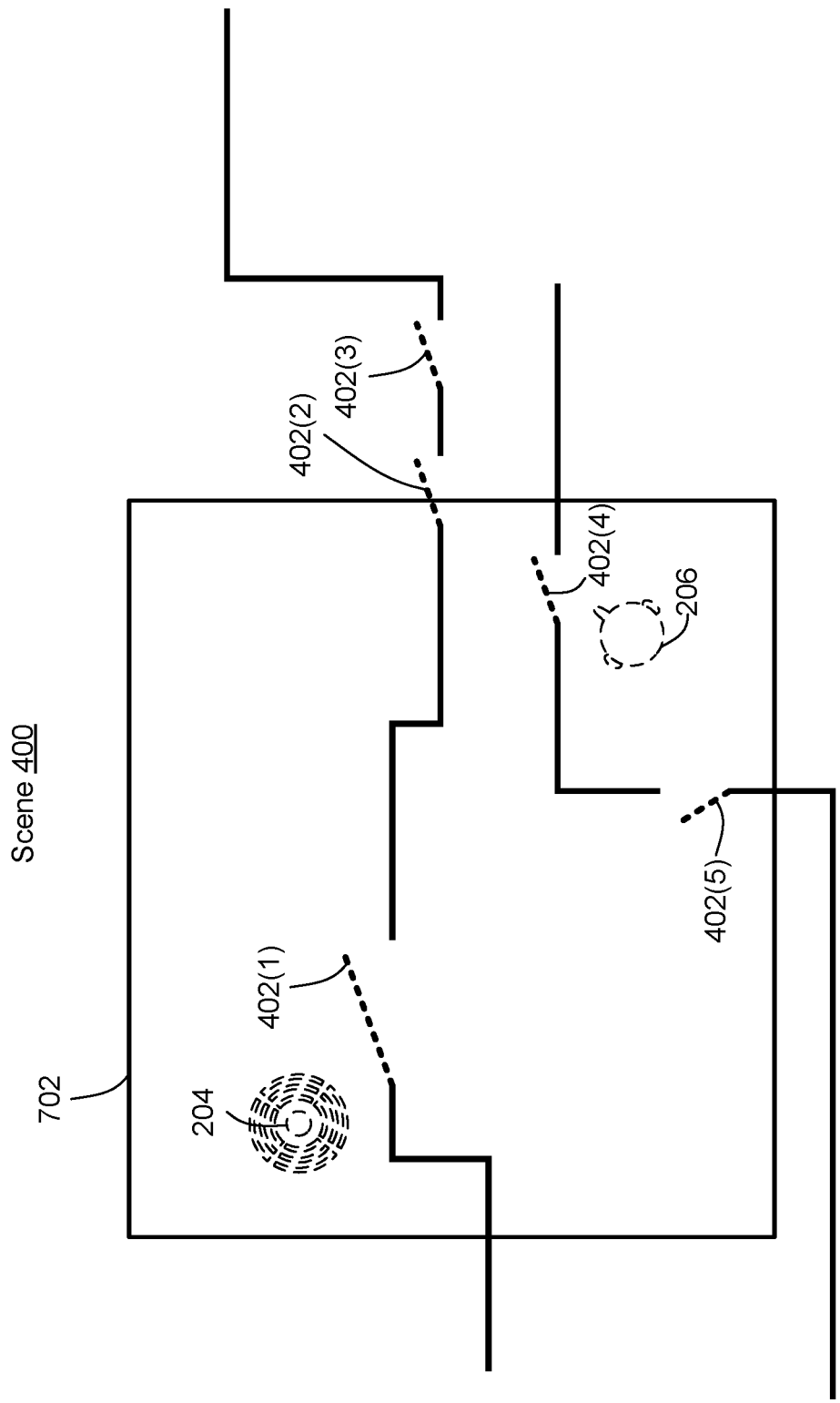

In some cases, bounding shapes can be used to eliminate portals from consideration. For instance, FIG. 7 illustrates a bounding box filter 702. The filter is a bounding box defined by the locations of the source and the listener and the initial sound delay therebetween, as discussed more below. Portal 402(3) is outside the boundaries of the bounding box filter (i.e., does not have a single point inside the bounding box filter) and thus can be excluded as a candidate portal for intercepting the initial sound path.

Figure 8:
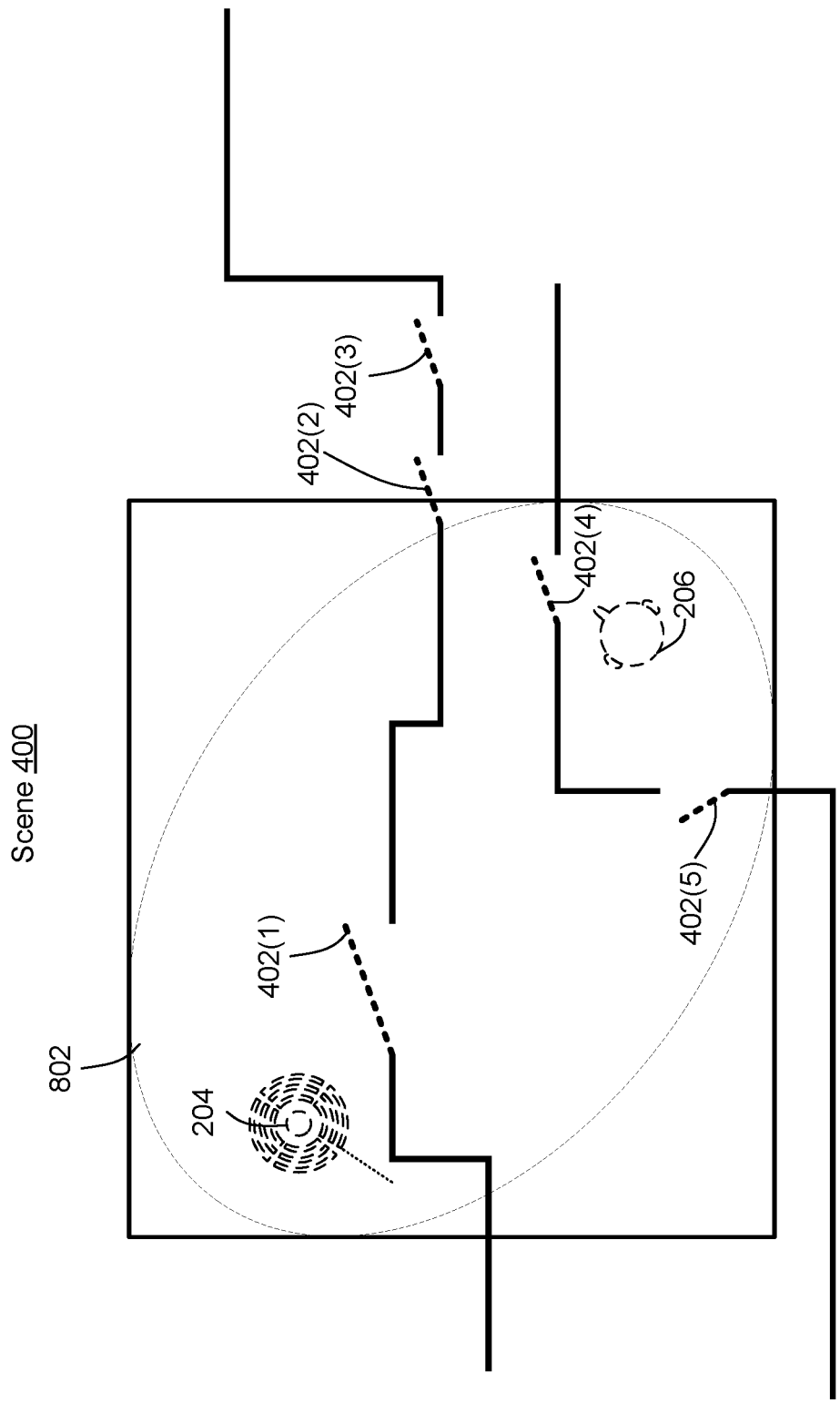

FIG. 8 illustrates a bounding ellipsoid filter 802. The filter is an ellipsoid defined by the locations of the source and the listener and the initial sound delay therebetween, as discussed more below. Portal 402(2) is outside the boundaries of the bounding ellipsoid filter and thus can be excluded as a candidate portal for intercepting the initial sound path.

Generally, computations to determine whether a given point falls within a bounding box are less complex than those to determine whether a given point falls within an ellipsoid. Thus, some implementations use multiple filtering steps. In a first filtering step, all portals in the scene are evaluated using the bounding box filter, and portals that have no points inside the bounding box filter are excluded from further consideration. Then, a second filtering step is performed on all of the remaining portals with at least one point inside the bounding box filter. The second filtering step excludes portals that have no points inside the bounding ellipsoid filter. At that point, any remaining portals can be evaluated using the techniques described below to determine whether they are intercepted by the initial sound path.

Specific Algorithms

The following sections provide additional algorithmic detail on the concepts introduced above. The disclosed implementations provide a portal search method that leverages acoustic parameters, such as precomputed propagation delay and direction data, to find portals intervening the diffracted shortest path connecting a dynamic source and listener at runtime. This approach scales linearly with number of portals in the worst case, far cheaper in terms of CPU cost than explicit global path search that scales with scene area. Culling or filtering techniques are also provided to further accelerate runtime determination of the portals along the initial sound path, e.g., by eliminating portals outside of bounding shapes from consideration. Given the set of portals intercepted by a given sound path, geometric-acoustic approximations can be employed to model the additional direct and indirect energy loss from these portals, which can vary depending on their dynamic closure state.

As discussed above with respect to FIG. 1, a set of "probe" locations $\{x_i\}$ can be used to sample the space of potential locations the listener might visit at runtime. The probe locations can be laid out above walkable regions in the scene using an adaptive sampling approach with variable spacing of 0.5-4 m. Acoustic reciprocity can be employed by treating each $x_i$ as a source during pre-computation. A volumetric wave simulation can be computed on a cuboidal region centered at each probe using a wave solver. The simulation grid can be sub-sampled on a uniform 3D "emitter grid" of points $\{x'_j\}$ that represent potential runtime source locations, with a spacing of 1-1.5 m. The directional impulse response at each simulation grid cell can be passed through a streaming encoder that extracts perceptual acoustic parameters. The overall simulation process thus results in a set of perceptual acoustic parameters that depend on runtime source and listener location pair, $(x'_j,x_i)$. The data can then be compressed. Given a source-listener location pair $(x^0, x)$, the parameters can be decompressed and spatially interpolated at runtime using nearby points $(x'_j,x_i)$. This decoding is the primary CPU cost.

The following four encoded parameters can be employed to model the effects of dynamic portals in a given scene. These parameters collectively capture the time of arrival and distribution of energy around the listener at location x due to a source at $x^0$.

(1) Initial delay, $\tau_0$. Assuming the impulsive source goes off at t=0, the wavefront propagating from source to listener $x' \rightsquigarrow x$ along shortest path through the scene, potentially diffracting around intervening portals, first arrives at time $t=\tau_0$. Values can be quantized, e.g., at 2 ms. The length of the shortest path can be computed as $c\tau_0$, where c=340 m/s is the speed of sound.

(2) Initial loudness, L. The initial sound can be defined as energy arriving immediately after $\tau_0$ within a 10 ms period, that is perceptually fused into a single, perceptually-dominant acoustic event due to the Precedence Effect. The corresponding loudness is L in dB.

(3) Initial direction, $s_0$. The propagation direction of the initial sound wavefront as it crosses the listener. For example, if the sound arrives at the listener through a visible portal, this direction will point from the portal towards the listener. FIG. 3 illustrates an arrival direction field representing this parameter.

(4) Directional reflections loudnesses, $R_j$. Indirect reflected energy is accumulated in an 80 ms time window. Its spherical energy distribution around the listener can be represented using a linear combination of Cosine-squared basis functions centered on the six axial directions $S_j=\{+Z, +Y, +Y, -Z, -Y, -Z\}$ in world space. The weight for each basis function, $R_j$ corresponds to indirect energy arriving around axial direction $S_j$ converted to logarithmic (dB) scale.

Precomputation and Runtime Overview

The disclosed implementations can employ the four acoustic parameters discussed above to identify portals that are intercepted as initial sound propagates from x' to x and then appropriately modify the energetic parameters $\{L, R_j\}$ to model the additional occlusion introduced by the intercepted portals.

The following discussion uses $k \in [1,N]$ to index over portals. Let $O_k$ denote the convex polygon representing the k-th portal opening, $n_k$ its normal (e.g., normal 108 in FIG. 1), $x_k$ its centroid (e.g., the location of probe 104 in FIG. 1), and $r_k$ the radius of a bounding circle with center $x_k$. In some implementations, portal openings can be explicitly marked within the 3D scene as convex 2D polygons. In a game editor workflow to create a scene, this need not involve manually marking each portal, as portals such as doors and windows can be implemented as instances of a few archetype classes that encapsulate the visual, auditory, animation, and interaction properties of the object class. This allows editing on each portal type to be automatically propagated to all actual instances in the virtual world. For instance, the portal information for FIG. 1 could specify the dimensions, centroid, and/or normal vector 108 of portal 106.

Once the additional portal markup has been performed the geometric portal properties described above are collected.

As noted, simulations are also performed from the center of each portal, thus augmenting the set of simulated probes to $\{x_i\} \cup \{x_k\}$. As noted previously, some implementations may model portals as being open during precomputation to ensure energy is able to propagate throughout the scene.

Precomputation passes the portal information collected above to the runtime component, in addition to the encoded perceptual parameter dataset that is decoded at runtime. The following description uses the notation $P(x_{source}, x_{listener})$ to denote lookup of parameter P with first argument as source location and second argument listener location. Runtime computation can proceed in two steps as described below. First, given the source and listener locations (x', x), search for all portals that intercept the initial sound propagating from source to listener. Second, the dynamic state for the intervening portals can be employed to modify the energetic acoustic parameters to render additional occlusion by the intercepted portals.

Portal Search

The following provides a technique to quickly find intervening portals, and subsequently various refinements are discussed. Assume for the following that portal size can be ignored ($r_k \rightarrow 0$) and consider the k-th portal with centroid at $x_k$. Shortest paths obey optimal sub-structure: $x_k$ lies along the shortest path $x' \rightsquigarrow x$, if and only if $x' \rightsquigarrow x_k$ and $x_k \rightsquigarrow x$ are also shortest paths. This is also true for their path lengths. Observe that the precomputed initial sound delay, $\tau_0$, is proportional to the length of the shortest path via $c\tau_0$. Thus, finding all portals on the shortest path connecting x' to x amounts to a linear search to find all $k \in [1,N]$ such that, $$\tau_0(x',x) = \tau_0(x',x_k) + \tau_0(x,x_k) \quad (1)$$

Note that this test does not necessarily involve any explicit construction of the sub-paths, for instance, by using an expensive A* march from x' to x on a grid, which in the worst-case scales with the area of the scene. Instead, the disclosed techniques can leverage the extensive geometric exploration of scene topology already performed by wave simulations during precomputation. There can be multiple portals that satisfy this equation if they all lie along the shortest path.

The disclosed implementations can also account for sources of deviation. For instance, portals have finite size so that the shortest path will pass through somewhere within the portal $O_k$ rather than its centroid $x_k$. In addition, the shortest path delay estimates in zo can contain errors from quantization and spatial interpolation.

Recall from above that the initial sound delay from the source location to the listener location can be determined from precomputed parameters. Thus, the length of the shortest path from source to listener $c\tau_0(x',x)$ is known, but not full path itself, e.g., the precomputed information does not specify which point on the portal $\tilde{x}_k \in O_k$ the path went through. For portals of finite size, the relation in Equation 1 is accurate with the substitution $x_k \leftarrow \tilde{x}_k$. The disclosed implementations employ a "string tightening" procedure to estimate $\tilde{x}_k$ by exploiting the delay and direction data precomputed for the "portal probe" placed at the centroid, $x_k$.

Figure 9:
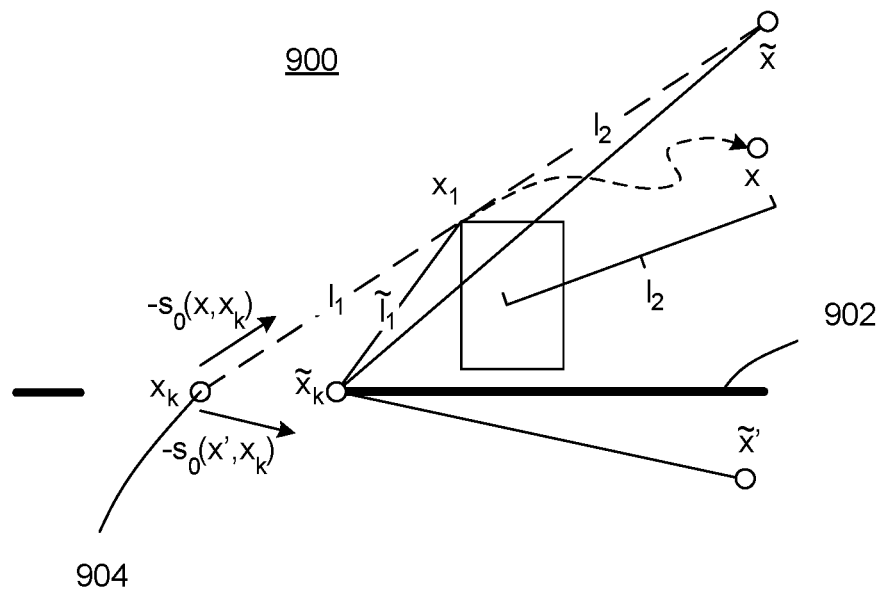
FIG. 9 illustrates an example of a string tightening procedure, consistent with some implementations of the present concepts.

FIG. 9 shows a scene portion 900 with a wall 902 and probe 904 at a portal centroid. Precomputed data for probe 904 can be decoded to obtain the arrival delay $\tau_0(x,x_k)$ and propagation direction $s_0(x,x_k)$ of the initial sound at listener location $x_k$, if a source had been placed at x. This can be used to compute the apparent listener location, $$\tilde{x} = x_k - \tau_0(x,x_k) s_0(x,x_k) \quad (2)$$

The apparent source location can be similarly computed, $$\tilde{x} = x_k - c\tau_0(x, x_k) s_0(x, x_k) \quad (3)$$

Given this information, the point $\tilde{x}_k \in O_k$ that minimizes $|\tilde{x} - \tilde{x}_k| + |\tilde{x}'^0 - \tilde{x}_k|$ can be identified to find the shortest path connecting $\tilde{x}'$ and $\tilde{x}$ via the portal, shown with orange lines in the figure. Equation 1 can be modified to:

$$|\tilde{x} - \tilde{x}_k| + |\tilde{x} - \tilde{x}_k| \leq c\tau_0(x', x) \quad (4)$$

To derive this upper bound, first consider the path from listener at x up to the portal. The shortest path from $x_k$ to x will consist of piece-wise linear segments as it wraps around scene geometry such as wall 902. Let the first segment's length be $l_1$ with end-point $x_1 = x_k - l_1 s_0$. The remaining shortest path can be arbitrarily complex, shown with dashed line, with length $l_2 \geq 0$. By the definition of $\tilde{x}$, $x_k x_1 \tilde{x}$ is a line segment with length $l_1 + l_2 = c\tau_0(x, x_k)$. With portal centered at $x_k$, imagine growing its size smoothly from zero: the shortest path from x to x' will be topologically similar to the path going through $x_k$, differing only in going through the shorter segment $x_1 \tilde{x}_k$ with length $\tilde{l}_1$ with total shortest path length of $\tilde{l}_1 + l_2$ from listener up to the portal. This argument holds as long as the portal is not large enough to cause a discontinuous jump in the shortest path from x' to x. In practice, this approach works robustly for portals a few meters across such as doors and windows.

Consider the triangle with vertices $\tilde{x} x_1 \tilde{x}_k$ in FIG. 9. The triangle inequality shows that $|\tilde{x} - \tilde{x}_k| \leq \tilde{l}_1 + l_2$. Applying the same argument from source to portal, $|x' - \tilde{x}_k| \leq \tilde{l}'_1 + l'_2$. Summing these two inequalities, the right hand side becomes the shortest path length, yielding Equation 4. Note that that the path details such as $l_1$ and $l_2$ are provided for discussion but are not necessarily employed to identify the portals intercepted by a sound path at runtime Interpolation The delay and direction of initial sound $\{\tau_0, s_0\}$ can contain errors from spatial interpolation that can be taken into account as follows. A tolerance term, $\varepsilon$, can be employed to yield the final criterion for portal search:

$$|x' - \tilde{x}_k| + |x - \tilde{x}_k| \leq c\tau_0(x', x) + c\varepsilon \quad (5)$$

Acoustic reciprocity can be employed in Equation 5 to treat the portal centroid $x_k$ as the listener location in all evaluations. Since there is a probe exactly at $x_k$ during precomputation, probe interpolation error is avoided. But interpolation errors on the emitter grid $\{x_j'\}$ remain. An algorithm proposed below mitigates interpolation errors in estimating delay and direction, allowing a tolerance of $\varepsilon = 10$ ms, corresponding to path length difference of 3.4m.

Spatial interpolation can be performed for both the listener and the source using unstructured probe samples $\{x_i\}$ and uniform-grid emitter samples $\{x_j\}$ respectively. For either case, assume an arbitrary set of sample points $\{y_j\}$ with interpolation weights $\{w_j\}$ with corresponding parameters $(\tau_0^i, s_0^i)$. The following provides one non-linear approach:

$$\tilde{y}_i = y_i - c\tau_0^i s_0^i \quad (6)$$

$$\tau_0 = \sum_i w_i |y - \tilde{y}_i| / c$$

$$s_0 = \sum_i w_i (y - y_i) / |y - \tilde{y}_i|$$

Figure 10:
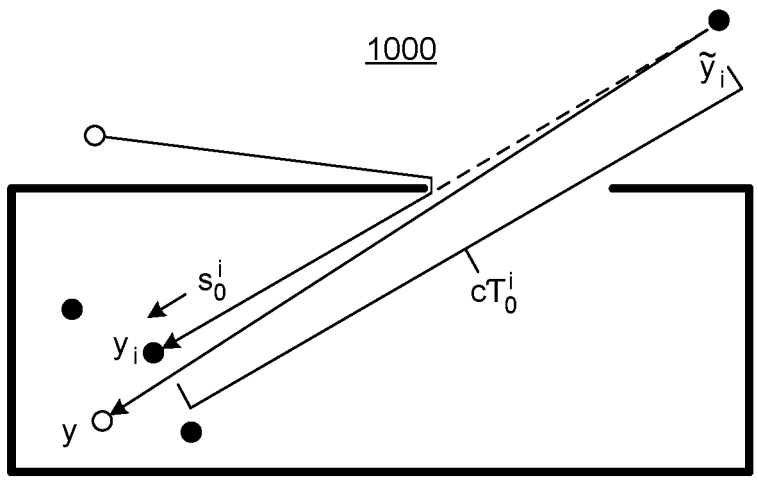
FIG. 10 illustrates an example of an interpolation procedure, consistent with some implementations of the present concepts.

As illustrated in FIG. 10 with respect to scene 1000, for each sample at $y_i$, an apparent location $\tilde{y}_i$ is computed that would result in the observed arrival delay and direction at $y_i$ assuming free space propagation. This apparent location can be used to evaluate the delay and direction contribution at the evaluation point, y, for this sample, linearly blended across all nearby samples. This approach is particularly useful for cases where y is not entirely surrounded by samples like the case shown in FIG. 10 by affording a degree of extrapolation to correctly produce an increased delay estimate compared to any of the sampled locations. For instance, this technique may be particularly useful in scenarios when the listener or source occupies the space between a sampled probe location and a wall.

Path Confirmation

Figure 11:
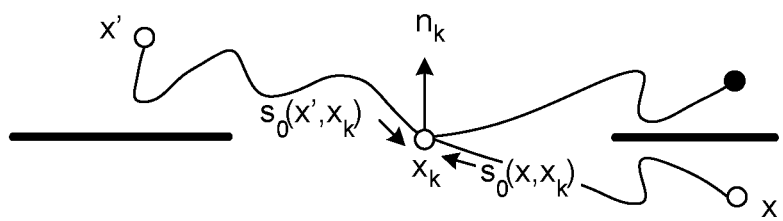
FIG. 11 illustrates an example of a test to determine whether a sound path pierces a portal, consistent with some implementations of the present concepts.

It is possible for the shortest path x' ⤳ x to pass within the error tolerances inherent in Equation 5 despite not piercing the portal. This case can occur when the source and listener are in a room and either of them walks close to a closed door. The result is immersion-breaking erroneous occlusion. Thus, the disclosed implementations can perform an additional test, illustrated in FIG. 11 with respect to scene 1100:

$$s_0(x_0, x_k) \cdot n_k \times s_0(x, x_k) \cdot n_k < 0 \quad (7)$$

Treating portal centroid $x_k$ as listener, the disclosed implementations can verify that the wavefront arriving at $x_k$ from x and x' are from opposite sides of the portal's plane, using its normal $n_k$. Note that negating $n_k$ preserves the result. This test allows portal occlusion to respond robustly to motion of the source or listener as they approach and cross a portal at a much finer spatial resolution than the few meters used for acoustic sampling.

Portal Culling

While evaluating the terms in Equation 5 is much cheaper than global path search, each evaluation still can involve decompression and interpolation of parameter fields. This can become costly in practice as large scenes can contain hundreds of portals over kilometer-squared areas and such evaluations must be repeated per sound source. Thus, some culling tests to reduce this cost can be employed.

Define the ellipsoidal volume $y \in E(x', x)$ if $|y - y'| + |y - x| < l_{max}$, with focii as x and x' and maximum path length $l_{max} = c\tau_0 + \Sigma$ on its surface. The interior of this ellipsoid contains all possible paths with length bounded as: $l(x' ⤳ x)|_{max}$, a necessary condition for Equation 5 to hold. Any portal that does not have at least one point inside this ellipsoid is too far away to intercept initial sound between the source and listener.

To further accelerate filtering or culling of portals from consideration, the disclosed implementations compute the ellipsoid's axis-aligned bounding box $B(x', x) \supset E(x', x)$. Using B+r to denote B enlarged by a scalar r in all six axial directions, a portal can be considered further provided its centroid $x_k$ satisfies"

$$x_k \in B(x_0, x) + r_k \quad (8a)$$

$$|x' - x_k| + |x_k - x| < l_{max} + r_k \quad (8b)$$

The additional radius term $r_k$ conservatively accounts for portal size via a bounding sphere. The bounding box test rejects most faraway portals and the second (more computationally expensive) test checks for detailed ellipsoid intersection.

Portal Search Algorithm Summary

For each source located at $x^0$ with listener at x, the portal search algorithm can iterate over all portal indices $k \in [1, N]$. For each, portals can be first culled using Equation 8a and then Equation 8b. If the tests pass, additional acoustic parameter lookups are performed for $(x,x_k)$ and $(x^0,x_k)$. Then Equation 7, and Equation 5 are applied in sequence and if satisfied, the portal can be declared to lie on the initial sound path from source to listener and its occlusion processing is applied as described in the next section. Multiple portals can pass these tests in which case all their occlusion effects can be accumulated. The output is a set of indices K of portals lying on the shortest path, and also the index of the last portal along the path from source to listener, $$K = \operatorname{argmin}_{k \in K} |\bar{x} - \bar{x}_k| \qquad (9)$$

Portal Occlusion Rendering

Given a set of portals and portal state information characterizing the extent to which individual portals are open or closed, the disclosed implementations can determine a first-order perturbation on energy transfer across the individual portals. This can be determined dynamically as each portal opens or closes, ignoring any additional loss on higher-order paths that cross a given portal multiple times. For instance, consider two rooms with a shared door. The reverberation time in such cases can depend on the sizes of both rooms, which can be modeled using the disclosed implementations since portals are left open during precomputation. However, as an acoustically-opaque door is shut, the reverberation times for the two rooms progressively decouple. Some implementations utilize small portals a few meters across to avoid inconsistent user experiences.

Each portal state can be dynamically represented as an open-area fraction, $\alpha_k \in [0,1]$ synchronized to visual animation. Since the precomputation already includes diffraction effects from portal geometry for $\alpha_k=1$, the disclosed implementations can model the relative perturbation on initial loudness $L(x',x)$. This can be approximated by assuming the energy transferred through a portal is proportional to its open area, invoking a geometric approximation. For the initial loudness this yields, $$L \leftarrow L + 10 \log_{10} \alpha, \text{ where } \alpha \equiv \prod_{k \in K} \alpha_k \qquad (10)$$

where the initial sound's energy can be computed as $10^{L/10}$, multiply the accumulated fractional energy loss from all portals in $\alpha$ and transform back to perceptual dB domain. More sophisticated (and expensive) aperture loss diffraction models can be employed, such as using a numerically-evaluated Kirchoff Approximation integral over the detailed dynamic aperture geometry as it closes.

Accounting for portal occlusion on reflected sound can be more involved, because multi-bounce energy at the listener can also arrive via other static openings in the world. The spherical distribution of reflected loudness (in dB) at the listener can be captured by parameters, $R_J(x',x)$ around six axial directions indexed by J. Define the corresponding directional energy as $E_* \equiv 10^{(R^*/10)}$, and total energy $E(x', x) = \Sigma_J E_J$.

The disclosed implementations can first estimate $E_k$, which is the portion of total energy E that passes through the chain of intercepted portals $k \in K$ to finally exit from the last portal K to arrive at the listener. The total energy received on portal K from the source is approximately $A(O_k)E(x', x_k)$ where $A(O_k)$ is the portal's area. This approximates by assuming a diffuse reverberant field with uniform energy distribution across the portal. To model the transport from the portal up to the listener, consider putting a source with matching radiated energy on the portal, and observe the reflected energy received at the listener. Point sources injected during simulation are normalized to have unit amplitude at 1 m distance, corresponding to total radiated energy of $\int_{s^2} p^2 ds = 4\pi$. Invoking reciprocity so that $E(x_k,x)=E(x,x_k)$ to reduce interpolation error yields the estimate, $$E_k(x', x) \approx \frac{A(O_k)}{4\pi} E(x', x_k) E(x, x_k) \qquad (11)$$

The true value of $E_k$ can obey reciprocity since swapping (x',x) reverses all propagation paths x' x which clearly represent the same net energy transfer across the portal. Note that this approximation preserves this property, as it is manifestly invariant to interchanging x and x'.

Next, estimate how $E_k$ gets directionally distributed around the listener after radiating from portal K. An additional acoustic lookup with a given portal as a virtual source can be employed to compute $E_J(x_k,x)$, and compute, $$E_J^\kappa(x', x) = \frac{E_k(x', x)}{E(x_k, x)} E_J(x_k, x) \qquad (12)$$

The first factor normalizes so that total energy $\Sigma_J E_J^\kappa = E_J$ while preserving the relative directional distribution of reflected arrivals at the listener due to energy arriving from the portal, as captured in $E_J(x_k,x)$. Thus, energy arriving in world direction $X_J$ at the listener can be split into that arriving through the portal of interest, κ: $E_J^\kappa(x',x)$, while the residual energy: $E_J(x',x) - E_J^\kappa(x',x)$, arrives through other portals or openings in the environment.

Assuming that the actual transmitted energy at runtime is in proportion to open area, same as in Equation 10, the net directional energy at listener due to portals on the shortest path can be determined: $\alpha E_J^\kappa(x',x)$. Summing with residual energy, the total directional energy at the listener can be obtained: $E_J(x',x) - (1-\alpha) E_J^\kappa(x',x)$. Finally, the reflection loudness parameters can be updated as, $$R_J \leftarrow 10 \log_{10} \max \{\beta E_J, E_J - 1(1-\alpha)E_J^\kappa \qquad (13)$$

The clamp above $\beta E_j$ with $\beta=0.01$ ensures that only up to $1-\beta=0.99$ fraction of the reflected energy is removed. This ensures reverberation is not entirely removed due to approximation inherent in Equation 11.

Note that the initial sound's occlusion per energy considerations in Equation 10 renders a plausible effect matching everyday experience: the loudness reduction is small initially, but reduces abruptly as the portal is about to close shut. The disclosed implementations can be where there are multiple portals along the initial sound path, rendering their combined occlusion.

Thus, the disclosed implementations provide a technique to model dynamic portals for interactive wave-based sound propagation, providing a useful improvement to the audio-visual plausibility of precomputed sound modeling. This includes a linear-time search algorithm for portals along the shortest diffracted path from source to listener that re-uses precomputed arrival delay and direction data, avoiding a costly explicit path search that takes far more CPU operations compared to the disclosed techniques. Also discussed above are acceleration techniques and improvements that can be employed in practice for robust behavior and to further reduce the number of CPU operations that are employed. Although doors were used for the purpose of examples, the disclosed techniques generalize to any dynamic aperture whose location is known beforehand. For instance, if there is a small portion of wall in an otherwise static scene that can collapse during gameplay, it can effectively be treated as a dynamic portal.

First Example System

The above discussion provides various examples of acoustic parameters that can be encoded for various scenes. Further, note that these parameters can be simulated and precomputed using isotropic sound sources. At rendering time, portal state can be accounted for when rendering sound discussed above. To do so, the disclosed implementations offer the ability to determine which portals lie on the initial sound path between arbitrary source and listener locations at runtime based on precomputed parameters.

Figure 12:
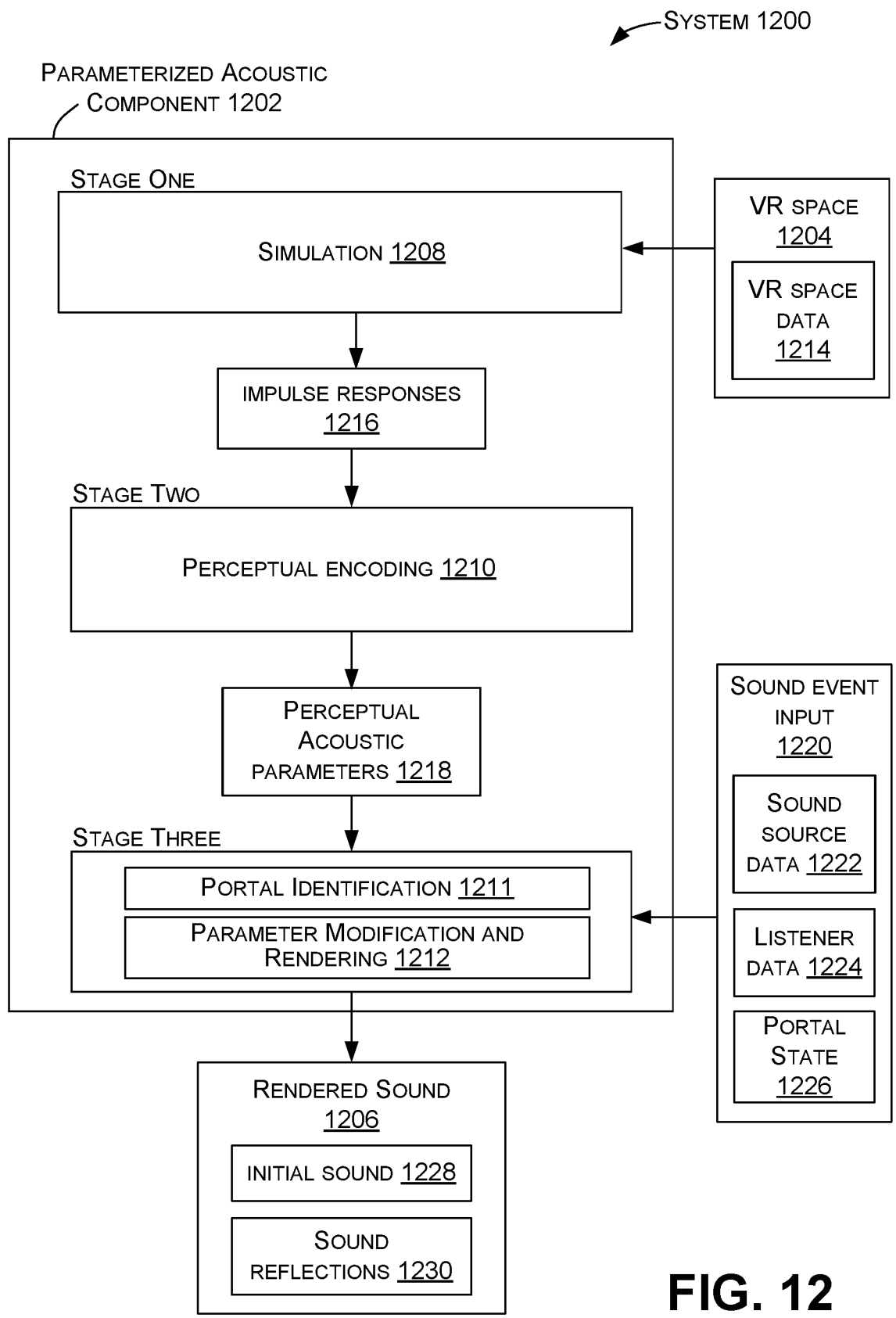
FIGS. 12 and 13 illustrate example systems that are consistent with some implementations of the present concepts.

A first example system 1200 is illustrated in FIG. 12. In this example, system 1200 can include a parameterized acoustic component 1202. The parameterized acoustic component 1202 can operate on a scene such as a virtual reality (VR) space 1204. In system 1200, the parameterized acoustic component 1202 can be used to produce realistic rendered sound 1206 for the virtual reality space 1204. In the example shown in FIG. 12, functions of the parameterized acoustic component 1202 can be organized into three Stages. For instance, Stage One can relate to simulation 1208, Stage Two can relate to perceptual encoding 1210, and Stage Three can relate to portal identification 1211 and rendering 1212. Stage One and Stage Two can be implemented as precompute steps, and Stage Three can be performed at runtime. Also shown in FIG. 12, the virtual reality space 1204 can have associated virtual reality space data 1214. The parameterized acoustic component 1202 can also operate on and/or produce impulse responses 1216, perceptual acoustic parameters 1218, and sound event input 1220. The sound event input can include sound source data 1222 and/or listener data 1224 associated with a sound event in the virtual reality space 1204, as well as portal state information 1226 conveying the state of one or more portals at a time of the sound event. In this example, the rendered sound 1206 can include rendered initial sound(s) 1228 and/or rendered sound reflections 1230.

As illustrated in the example in FIG. 12, at simulation 1208 (Stage One), parameterized acoustic component 1202 can receive virtual reality space data 1214. The virtual reality space data 1214 can include geometry (e.g., structures, materials of objects, portals, etc.) in the virtual reality space 1204. For instance, the virtual reality space data 1214 can include a voxel map for the virtual reality space 1204 that maps the geometry, including structures and/or other aspects of the virtual reality space 1204, such as the centroid, dimensions, and normal vector for each portal in a scene. In some cases, simulation 1208 can include acoustic simulations of the virtual reality space 1204 to precompute sound wave propagation fields such as those discussed above with respect to FIG. 3. More specifically, in this example simulation 1208 can include generation of impulse responses 1216 using the virtual reality space data 1214. The impulse responses 1216 can be generated for initial sounds and/or sound reflections. Stated another way, simulation 1208 can include using a precomputed wave-based approach to capture the acoustic characteristics of a complex scene.

In some cases, the simulation 1208 of Stage One can include producing relatively large volumes of data. For instance, the impulse responses 1216 can be represented as multi-dimensional function associated with the virtual reality space 1204. For instance, the dimensions can include dimensions relating to the position of a sound source, dimensions relating to the position of a listener, a time dimension, dimensions relating to the arrival direction of incoming sound from the perspective of the listener, and/or dimensions relating to departure direction of outgoing sound from the perspective of the source. Thus, the simulation can be used to obtain impulse responses at each probed listener location in the scene. As discussed more below, perceptual acoustic parameters can be encoded from these impulse responses for subsequent rendering of sound in the scene.

One approach to encoding perceptual acoustic parameters 1218 for virtual reality space 1204 would be to generate impulse responses 1216 for every combination of possible source and listener locations, e.g., every pair of voxels. While ensuring completeness, capturing the complexity of a virtual reality space in this manner can lead to generation of petabyte-scale wave fields. This can create a technical problem related to data processing and/or data storage. The techniques disclosed herein provide solutions for computationally efficient encoding and rendering using relatively compact representations.

For example, impulse responses 1216 can be generated based on probes deployed at particular listener locations within virtual reality space 1204. Example probes are shown above in FIG. 1. This involves significantly less data storage than sampling at every potential listener location (e.g., every voxel). The probes can be automatically laid out within the virtual reality space 1204 and/or can be adaptively sampled. For instance, probes can be located more densely in spaces where scene geometry is locally complex (e.g., inside a narrow corridor with multiple portals), and located more sparsely in a wide-open space (e.g., outdoor field or meadow). In addition, vertical dimensions of the probes can be constrained to account for the height of human listeners, e.g., the probes may be instantiated with vertical dimensions that roughly account for the average height of a human being. Similarly, potential sound source locations for which impulse responses 1216 are generated can be located more densely or sparsely as scene geometry permits. Reducing the number of locations within the virtual reality space 1204 for which the impulse responses 1216 are generated can significantly reduce data processing and/or data storage expenses in Stage One.

As noted, virtual reality space 1204 can have dynamic geometry, such as portals that open or close at runtime. For example, a door in virtual reality space 1204 might be opened or closed, or a wall might be blown up, changing the geometry of virtual reality space 1204. In such examples, simulation 1208 can receive virtual reality space data 1214 that provides a geometry for the virtual reality space with all portals in an open state. The centroid for each portal can also be probed, as described previously.

As shown in FIG. 12, at Stage Two, perceptual encoding 1210 can be performed on the impulse responses 1216 from Stage One. In some implementations, perceptual encoding 1210 can work cooperatively with simulation 1208 to perform streaming encoding. In this example, the perceptual encoding process can receive and compress individual impulse responses as they are being produced by simulation 1208. For instance, values can be quantized (e.g., 3 dB for loudness) and techniques such as delta encoding can be applied to the quantized values. Unlike impulse responses, perceptual parameters tend to be relatively smooth, which enables more compact compression using such techniques. Taken together, encoding parameters in this manner can significantly reduce storage expense.

Generally, perceptual encoding 1210 can involve extracting perceptual acoustic parameters 1218 from the impulse responses 1216. These parameters generally represent how sound from different source locations is perceived at different listener locations. Example parameters are discussed above. For example, the perceptual acoustic parameters for a given source/listener location pair can include initial sound parameters such as an initial delay period, initial departure direction from the source location, initial arrival direction at the listener location, and/or initial loudness. The perceptual acoustic parameters for a given source/listener location pair can also include reflection parameters such as a reflection delay period and reflection loudness, as well as reverberation parameters such as a decay time. Encoding perceptual acoustic parameters in this manner can yield a manageable data volume for the perceptual acoustic parameters, e.g., in a relatively compact data file that can later be used for computationally efficient rendering.

The parameters for encoding reflections can also include a decay time of the reflections. For instance, the decay time can be a 60 dB decay time of sound response energy after an onset of sound reflections. In some cases, a single decay time is used for each source/location pair. In other words, the reflection parameters for a given location pair can include a single decay time together with reflection loudness.

Additional examples of parameters that could be considered with perceptual encoding 1210 are contemplated. For example, frequency dependence, density of echoes (e.g., reflections) over time, directional detail in early reflections, independently directional late reverberations, and/or other parameters could be considered. An example of frequency dependence can include a material of a surface affecting the sound response when a sound hits the surface (e.g., changing properties of the resultant reflections).

As shown in FIG. 12, at Stage Three, portal identification 1211 and parameter modification and rendering 1212 can collectively utilize the perceptual acoustic parameters 1218 to render sound accounting for the dynamic state of portals in a given scene. As mentioned above, the perceptual acoustic parameters 1218 can be obtained in advance and stored, such as in the form of a data file. When a sound event in the virtual reality space 1204 is received, portals intercepted by initial sound from the source location to the listener location can be determined by decoding the data file and performing the portal search techniques described previously. Portal state for the intercepted portals can be employed to modify the acoustic parameters (e.g., initial and reflection loudness) to account for portal state and render the sound using the decoded perceptual acoustic parameters 1218 to produce rendered sound 1206. The rendered sound 1206 can include an initial sound(s) 1228 and/or sound reflections 1230, for example.

In general, the sound event input 1220 shown in FIG. 12 can be related to any event in the virtual reality space 1204 that creates a response in sound. The sound source data 1222 for a given sound event can include an input sound signal for a runtime sound source, a location of the runtime sound source, an orientation of the runtime sound source, etc. For clarity, the term "runtime sound source" is used to refer to the sound source being rendered, to distinguish the runtime sound source from sound sources discussed above with respect to simulation and encoding of parameters. The sound source data can also convey directional characteristics of the runtime sound source.

Similarly, the listener data 1224 can convey a location of a runtime listener and an orientation of the runtime listener. The term "runtime listener" is used to refer to the listener of the rendered sound at runtime, to distinguish the runtime listener from listeners discussed above with respect to simulation and encoding of parameters. The listener data can also convey directional hearing characteristics of the listener, e.g., in the form of a head-related transfer function (HRTF).

In addition, the sound event input can include portal state 1226, which conveys the state of each portal in the scene. For instance, the portal state can convey the open area of each portal in each scene, e.g., as a fraction or percentage. As previously noted, the location, dimensions, and normal vector for each portal can be provided earlier, at precompute time.

In some implementations, sounds can be rendered using a lightweight signal processing algorithm. The lightweight signal processing algorithm can render sound in a manner that can be largely computationally cost-insensitive to a number of the sound sources and/or sound events. For example, the parameters used in Stage Two can be selected such that the number of sound sources processed in Stage Three does not linearly increase processing expense.

The sound source data for the input event can include an input signal, e.g., a time-domain representation of a sound such as series of samples of signal amplitude (e.g., 44100 samples per second). The input signal can have multiple frequency components and corresponding magnitudes and phases. With respect to rendering initial loudness, the rendering can render an initial sound from the input sound signal that accounts for both runtime source and runtime listener location as well as portal state. For instance, given the runtime source and listener locations, the rendering can involve identifying the following encoded parameters that were precomputed in Stage Two for that location pair —initial delay time from the source to the listener, initial loudness, and arrival direction. In addition, initial delay times from the source to the centroid of each portal and the centroid of each portal to the listener can also be determined.

The input signal can be rendered as discussed above, while adjusting the loudness of the initial sound to account for portal state of the portals on the initial sound path from the sound source to the listener. The rendering can also render reflections from the input sound signal that account for both runtime source and runtime listener location as also discussed above, again adjusting loudness of the reflections arriving from one or more portals on the initial sound path.

Applications

The parameterized acoustic component 1202 can operate on a variety of virtual reality spaces 1204. For instance, some examples of a video-game type virtual reality space 1204 have been provided above. In other cases, virtual reality space 1204 can be an augmented office building that mirrors a real-world office building with various doors. For example, live attendees could be coming and going from the real-world conference room, while remote attendees log in and out. In this example, the voice of a particular live attendee, as rendered in the headset of a remote attendee, could fade away as a door closes in between the live attendee and the remote attendees.

In other implementations, animation can be viewed as a type of virtual reality scenario. In this case, the parameterized acoustic component 1202 can be paired with an animation process, such as for production of an animated movie. For instance, as visual frames of an animated movie are generated, virtual reality space data 1214 could include geometry of the animated scene depicted in the visual frames. A listener location could be an estimated audience location for viewing the animation. Sound source data 1222 could include information related to sounds produced by animated subjects and/or objects. In this instance, the parameterized acoustic component 1202 can work cooperatively with an animation system to model and/or render sound to accompany the visual frames while accounting for changes to various portals shown in the animation.

In another implementation, the disclosed concepts can be used to complement visual special effects in live action movies. For example, virtual content can be added to real world video images. In one case, a real-world video can be captured of a city scene. In post-production, virtual image content can be added to the real-world video, such as an animated character playing a musical instrument in the scene. In this case, relevant geometry of the buildings surrounding the corner would likely be known for the post-production addition of the virtual image content. Using the known geometry (e.g., virtual reality space data 1214) and a position, loudness, the parameterized acoustic component 1202 can provide audio corresponding to the enhanced live action movie. For instance, the sound of the instrument can be made to grow louder when the listener views the musician through an open window, and can become relatively quieter when the listener closes the window.

Overall, the parameterized acoustic component 1202 can model acoustic effects for arbitrarily moving listener and/or sound sources that can emit any sound signal in an environment with portals that change state. The result can be a practical system that can render convincing audio in real-time. Furthermore, the parameterized acoustic component can render convincing audio for complex scenes. As such, the techniques disclosed herein can be used to render sound for complex, changing 3D scenes within practical RAM and/or CPU budgets. The result can be a practical system that can produce convincing sound for video games and/or other virtual reality scenarios in real-time.

Example System

Figure 13:
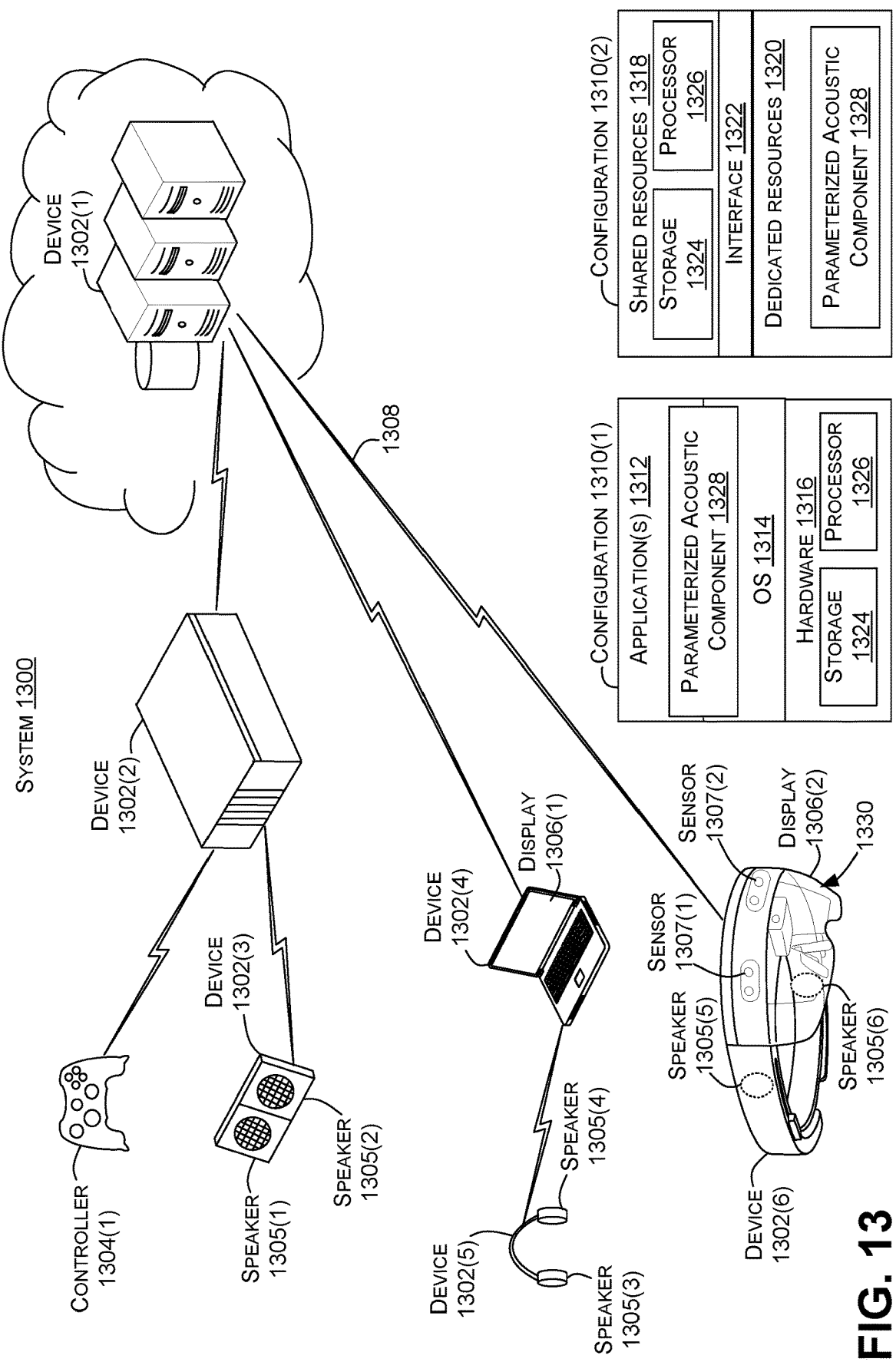

FIG. 13 shows a system 1300 that can accomplish parametric encoding and rendering as discussed herein. For purposes of explanation, system 1300 can include one or more devices 1302. The device may interact with and/or include controllers 1304 (e.g., input devices), speakers 1305, displays 1306, and/or sensors 1307. The sensors can be manifest as various 2D, 3D, and/or microelectromechanical systems (MEMS) devices. The devices 1302, controllers 1304, speakers 1305, displays 1306, and/or sensors 1307 can communicate via one or more networks (represented by lightning bolts 1308).

In the illustrated example, example device 1302(1) is manifest as a server device, example device 1302(2) is manifest as a gaming console device, example device 1302(3) is manifest as a speaker set, example device 1302(4) is manifest as a notebook computer, example device 1302(5) is manifest as headphones, and example device 1302(6) is manifest as a virtual reality device such as a head-mounted display (HMD) device. While specific device examples are illustrated for purposes of explanation, devices can be manifest in any of a myriad of ever-evolving or yet to be developed types of devices.

In one configuration, device 1302(2) and device 1302(3) can be proximate to one another, such as in a home video game type scenario. In other configurations, devices 1302 can be remote. For example, device 1302(1) can be in a server farm and can receive and/or transmit data related to the concepts disclosed herein.

FIG. 13 shows two device configurations 1310 that can be employed by devices 1302. Individual devices 1302 can employ either of configurations 1310(1) or 1310(2), or an alternate configuration. (Due to space constraints on the drawing page, one instance of each device configuration is illustrated rather than illustrating the device configurations relative to each device 1302.) Briefly, device configuration 1310(1) represents an operating system (OS) centric configuration. Device configuration 1310(2) represents a system on a chip (SOC) configuration. Device configuration 1310(1) is organized into one or more application(s) 1312, operating system 1314, and hardware 1316. Device configuration 1310(2) is organized into shared resources 1318, dedicated resources 1320, and an interface 1322 there between.

In either configuration 1310, the device can include storage/memory 1324, a processor 1326, and/or a parameterized acoustic component 1328. In some cases, the parameterized acoustic component 1328 can be similar to the parameterized acoustic component 1202 introduced above relative to FIG. 12. The parameterized acoustic component 1328 can be configured to perform the implementations described above and below.

In some configurations, each of devices 1302 can have an instance of the parameterized acoustic component 1328. However, the functionalities that can be performed by parameterized acoustic component 1328 may be the same or they may be different from one another. In some cases, each device's parameterized acoustic component 1328 can be robust and provide all of the functionality described above and below (e.g., a device-centric implementation). In other cases, some devices can employ a less robust instance of the parameterized acoustic component that relies on some functionality to be performed remotely. For instance, the parameterized acoustic component 1328 on device 1302(1) can perform functionality related to Stages One and Two, described above for a given application, such as a video game or virtual reality application. In this instance, the parameterized acoustic component 1328 on device 1302(2) can communicate with device 1302(1) to receive perceptual acoustic parameters 1218. The parameterized acoustic component 1328 on device 1302(2) can utilize the perceptual parameters with sound event inputs to produce rendered sound 1206 accounting for portal state in a scene, which can be played by speakers 1305(1) and 1305(2) for the user. In other cases, intercepted portal identification and rendering can be performed on different devices.

In the example of device 1302(6), the sensors 1307 can provide information about the location of a user of the device (e.g., the user's head and/or eyes relative to visual content presented on the display 1306(2)). The location can be used for rendering sounds to the user by treating the user as a listener or, in some cases, as a sound source. In device 1302(6), a visual representation 1330 (e.g., visual content, graphical use interface) can be presented on display 1306(2). In some cases, the visual representation can be based at least in part on the information about the location of the user provided by the sensors. Also, the parameterized acoustic component 1328 on device 1302(6) can receive perceptual acoustic parameters from device 1302(1). In this case, the parameterized acoustic component 1328(6) can produce rendered sound that accounts for the state of one or more portals in the scene.

In still another case, Stage One and Two described above can be performed responsive to inputs provided by a video game and/or virtual reality application. The output of these stages, e.g., perceptual acoustic parameters 1218, can be added to the video game as a plugin that also contains code for Stage Three. At runtime, when a sound event occurs, the plugin can apply the perceptual parameters to the sound event to compute the corresponding rendered sound for the sound event. In other implementations, the video game and/or virtual reality application can provide sound event inputs to a separate rendering component (e.g., provided by an operating system) that renders directional sound on behalf of the video game and/or virtual reality application.

In some cases, the disclosed implementations can be provided by a plugin for an application development environment. For instance, an application development environment can provide various tools for developing video games, virtual reality applications, and/or architectural walkthrough applications. These tools can be augmented by a plugin that implements one or more of the stages discussed above. For instance, in some cases, an application developer can provide a description of a scene to the plugin (including portal information as described previously), and the plugin can perform the disclosed simulation techniques on a local or remote device, and output encoded perceptual parameters for the scene. In addition, the plugin can implement scene-specific rendering given an input sound signal and information about source and listener locations and portal state, as described above.

The term "device," "computer," or "computing device" as used herein can mean any type of device that has some amount of processing capability and/or storage capability. Processing capability can be provided by one or more processors that can execute computer-readable instructions to provide functionality. Data and/or computer-readable instructions can be stored on storage, such as storage that can be internal or external to the device. The storage can include any one or more of volatile or non-volatile memory, hard drives, flash storage devices, and/or optical storage devices (e.g., CDs, DVDs etc.), remote storage (e.g., cloud-based storage), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

As mentioned above, device configuration 1310(2) can be thought of as a system on a chip (SOC) type design. In such a case, functionality provided by the device can be integrated on a single SOC or multiple coupled SOCs. One or more processors 1326 can be configured to coordinate with shared resources 1318, such as storage/memory 1324, etc., and/or one or more dedicated resources 1320, such as hardware blocks configured to perform certain specific functionality. Thus, the term "processor" as used herein can also refer to central processing units (CPUs), graphical processing units (GPUs), field programmable gate arrays (FPGAs), controllers, microcontrollers, processor cores, or other types of processing devices.

Generally, any of the functions described herein can be implemented using software, firmware, hardware (e.g., fixed-logic circuitry), or a combination of these implementations. The term "component" as used herein generally represents software, firmware, hardware, whole devices or networks, or a combination thereof. In the case of a software implementation, for instance, these may represent program code that performs specified tasks when executed on a processor (e.g., CPU or CPUs). The program code can be stored in one or more computer-readable memory devices, such as computer-readable storage media. The features and techniques of the component are platform-independent, meaning that they may be implemented on a variety of commercial computing platforms having a variety of processing configurations.

First Example Method

Figure 14:
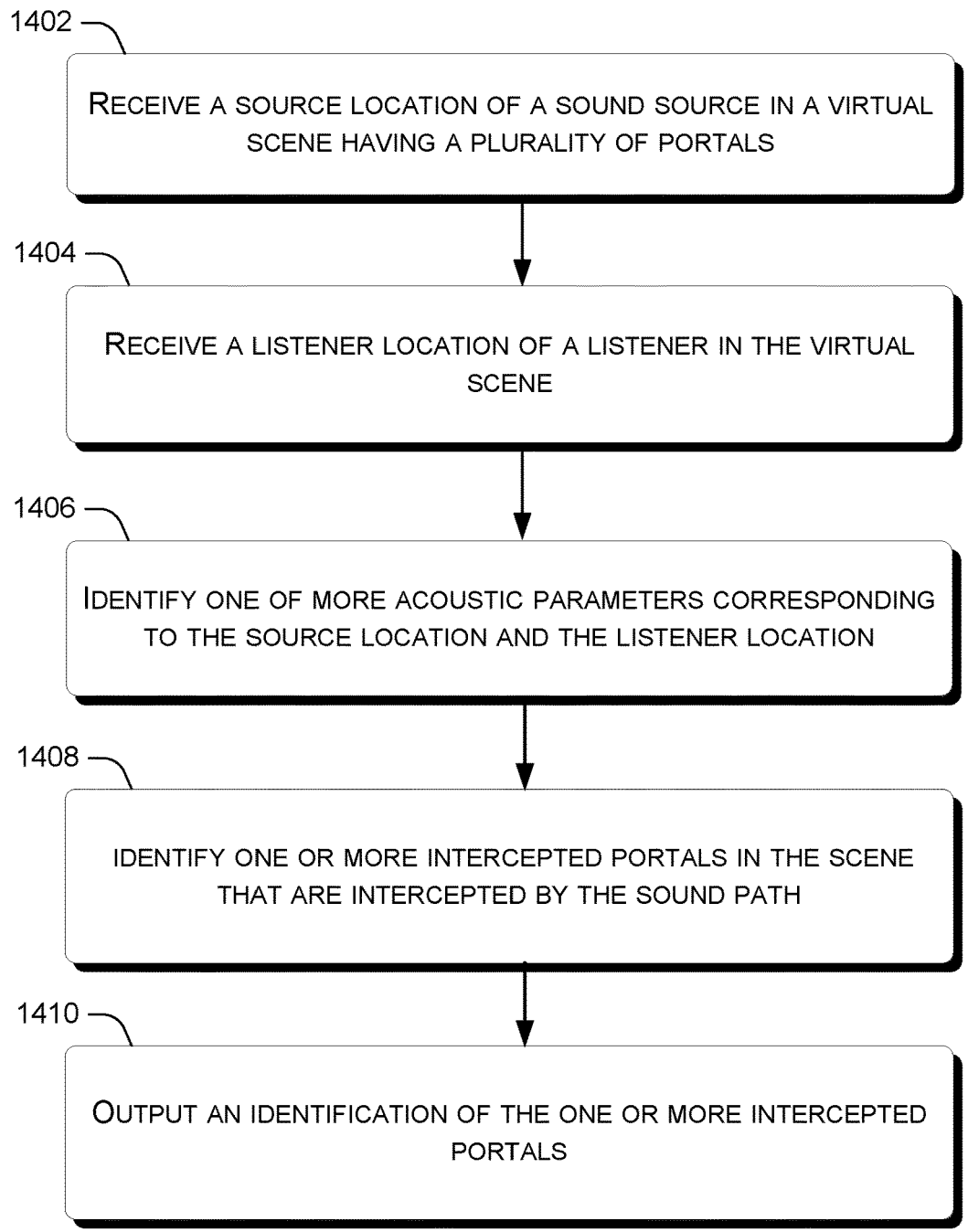
FIGS. 14, 15, and 16 are flowcharts of example methods in accordance with some implementations of the present concepts.

FIG. 14 shows a method 1400 that can be employed to identify portals in a scene that are intercepted by a sound path. For instance, method 1400 can be performed entirely by portal identification 1211 of Stage Three, as discussed above with respect to FIG. 12.

At block 1402, method 1400 can receive a source location of a sound source in a virtual scene having a plurality of portals. As previously noted, in some cases the portals have been marked with corresponding locations, dimensions, and/or normal vectors.

At block 1404, method 1400 can receive a listener location of a listener in the virtual scene. As previously noted, both sound sources and listeners can move at runtime, e.g., as updated at visual frame rates.

At block 1406, method 1400 can identify one or more acoustic parameters corresponding to the source location and the listener location. The one or more acoustic parameters can characterize travel of sound on a sound path from the source location to the listener location in the virtual scene, such as the initial sound path as introduced above with respect to FIGS. 2A and 2B.

At block 1408, method 1400 can use the one or more acoustic parameters to identify one or more intercepted portals in the scene that are intercepted by the sound path. As noted previously, the acoustic parameters used to identify the intercepted portals can characterize delay and direction data for the scene, without necessarily identifying full path information.

At block 1410, method 1400 can output an identification of the one or more intercepted portals. For instance, in some cases, the intercepted portals can be output from a portal identification module to a separate rendering module.

The one or more acoustic parameters identified at block 1406 and employed to identify the intercepted portals at block 1408 can include a first acoustic parameter specifying a first initial sound delay from the source location to the listener location. In addition, one or more second acoustic parameters specifying one or more second initial sound delays between the source location and the one or more intercepted portals can also be employed to identify the intercepted portals. Furthermore, one or more third acoustic parameters specifying one or more third initial sound delays between the one or more intercepted portals and the listener location can also be employed to identify the intercepted portals.

In some cases, block 1408 can include selecting the one or more intercepted portals from the plurality of portals in the scene based at least on a comparison of sums of path lengths through different portals in the scene to an initial sound path length of the initial sound path. A string tightening procedure can be employed to account for deviation of the initial sound path from respective centroids of the different portals. Block 1408 can also include confirming that the initial sound path travels through each of the one or more intercepted portals using a normal vector for each intercepted portal and an arrival direction of sound at the listener.

Block 1408 can also include using bounding shapes to perform filtering steps to eliminate certain portals from consideration prior to performing the string tightening procedure for the remaining portals. As discussed above, the bounding shapes can generally be specified by the location of the source and listener and the length of the initial sound path between the source and listener.

Second Example Method

Figure 15:
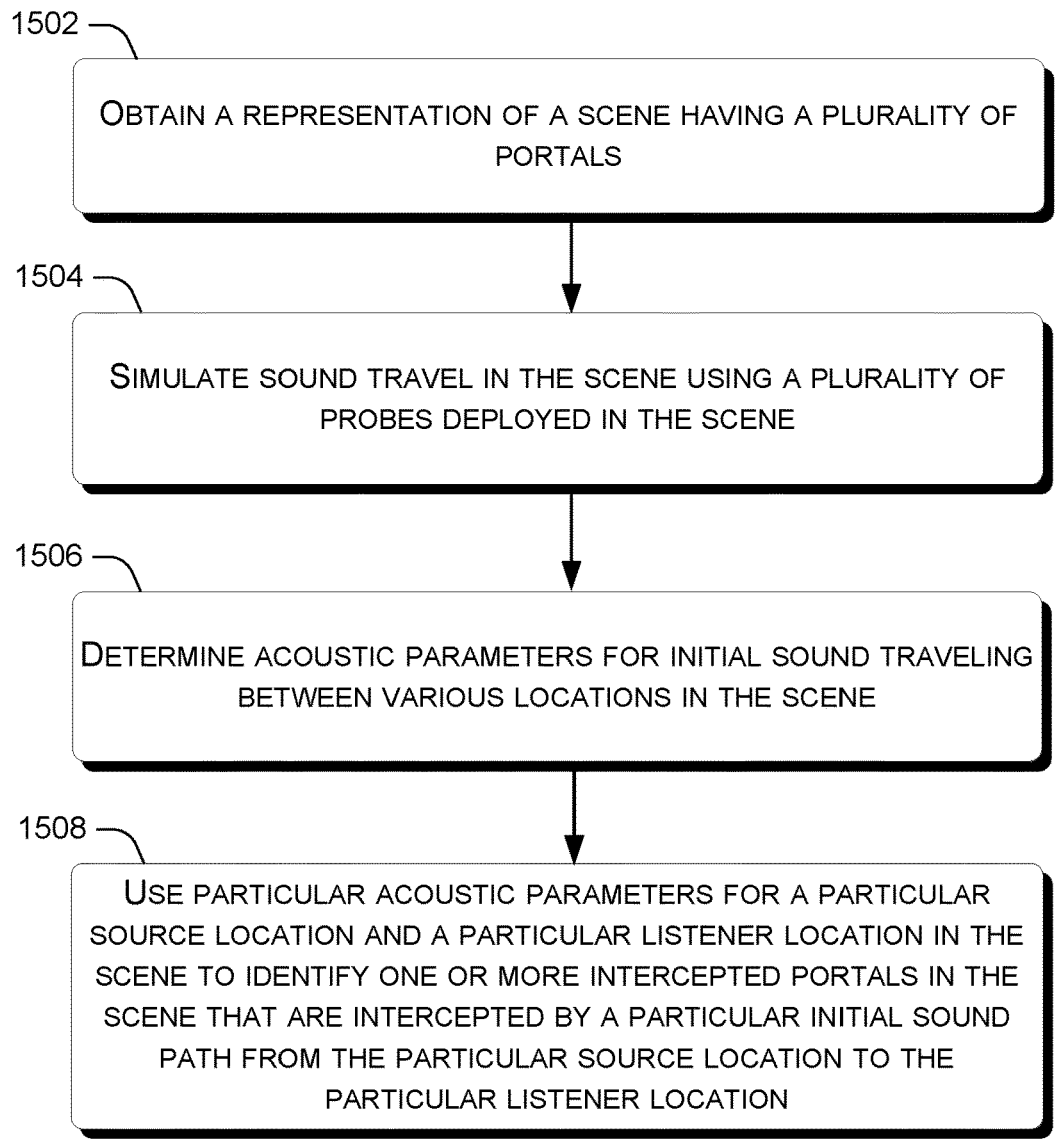

FIG. 15 shows a method 1500 that can be employed to identify portals in a scene that are intercepted by a sound path. For instance, method 1500 can be performed by parameterized acoustic component 1202, shown above in FIG. 12.

At block 1502, method 1500 can obtain a representation of a scene having a plurality of portals. For instance, a game developer or creator of a virtual or augmented reality experience can provide a description of a scene as well as information relating to portals in the scene.

At block 1504, method 1500 can simulate sound travel in the scene (e.g., of initial sound) using a plurality of probes deployed in the scene. As previously noted, the probes can represent various listener locations in the scene, and can include probes deployed at centroids of each portal.

At block 1506, method 1500 can determine acoustic parameters for initial sound traveling between various locations in the scene based on the simulating. The acoustic parameters can represent how sound is perceived at different locations in the scene. For instance, the acoustic parameters can include those described previously with respect to block 1406 of method 1400.

At block 1508, method 1500 can use particular acoustic parameters for a particular source location and a particular listener location in the scene to identify one or more intercepted portals in the scene that are intercepted by a particular initial sound path from the particular source location to the particular listener location. The particular acoustic parameters can be determined by interpolation of corresponding acoustic parameters for respective locations in the scene that are near the particular source location and the particular listener location. The intercepted portals can be identified as described above with respect to block 1408 of method 1400.

Third Example Method

Figure 16:
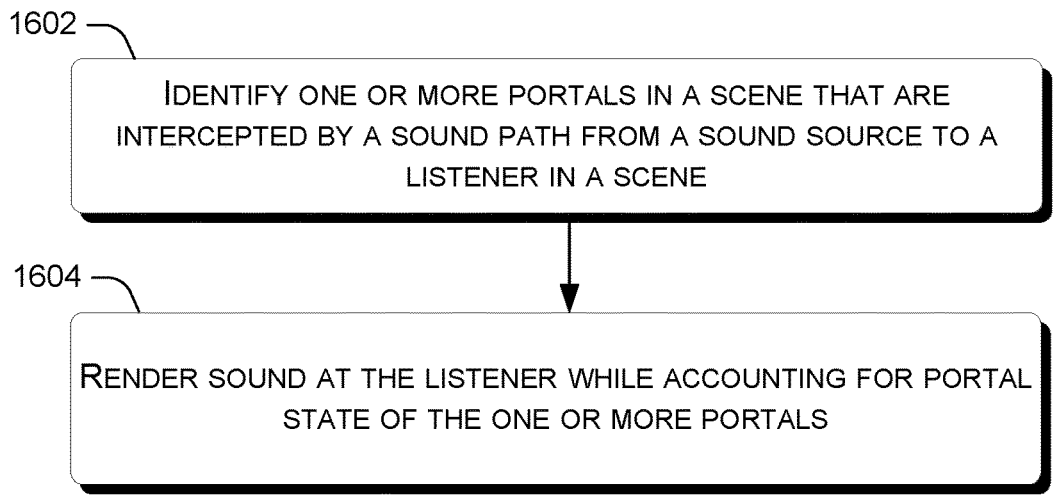

FIG. 16 shows a method 1600 that can be employed to identify portals in a scene that are intercepted by a sound path (e.g., of initial sound). For instance, method 1600 can be performed by parameterized acoustic component 1202, shown above in FIG. 12.

At block 1602, method 1600 can identify one or more portals in a scene that are intercepted by a sound path from a sound source to a listener in a scene. The intercepted portals can be identified based at least on precomputed acoustic parameters for the scene. For instance, the acoustic parameters can include those described previously with respect to block 1406 of method 1400. The intercepted portals can be identified as described above with respect to block 1408 of method 1400.

At block 1604, method 1600 can render sound at the listener while accounting for portal state of the one or more portals. As noted previously, the sound can be rendered by adjusting loudness of at least one of initial sounds or reflections based on the portal state.

Additional Examples

Various examples are described above. Additional examples are described below. One example includes a system comprising a processor and storage storing computer-readable instructions which, when executed by the processor, cause the system to: receive a source location of a sound source in a virtual scene having a plurality of portals, receive a listener location of a listener in the virtual scene, identify one or more acoustic parameters corresponding to the source location and the listener location, the one or more acoustic parameters characterizing travel of sound on a sound path from the source location to the listener location in the virtual scene, based at least on the one or more acoustic parameters, identify one or more intercepted portals in the virtual scene that are intercepted by the sound path, and output an identification of the one or more intercepted portals.

Another example can include any of the above and/or below examples where the sound path is an initial sound path of initial sound.

Another example can include any of the above and/or below examples where the one or more acoustic parameters include a first acoustic parameter specifying a first initial sound delay from the source location to the listener location.

Another example can include any of the above and/or below examples where the one or more acoustic parameters include one or more second acoustic parameters specifying one or more second initial sound delays between the source location and the one or more intercepted portals.

Another example can include any of the above and/or below examples where the one or more acoustic parameters include one or more third acoustic parameters specifying one or more third initial sound delays between the one or more intercepted portals and the listener location.

Another example can include any of the above and/or below examples where the one or more second acoustic parameters specify the one or more second initial sound delays between the source location and one or more centroids of the one or more intercepted portals, and the one or more third acoustic parameters specify the one or more third initial sound delays between the one or more centroids of one or more intercepted portals and the listener location.

Another example can include any of the above and/or below examples where the computer-readable instructions, when executed by the processor, cause the system to select the one or more intercepted portals from the plurality of portals in the virtual scene based at least on a comparison of an initial path length of the initial sound path to other path lengths from the source location to the listener through different portals in the virtual scene.

Another example can include any of the above and/or below examples where the computer-readable instructions, when executed by the processor, cause the system to perform a string tightening procedure to account for deviation of the initial sound path from respective centroids of the different portals.

Another example can include any of the above and/or below examples where the computer-readable instructions, when executed by the processor, cause the system to using a normal vector for each intercepted portal and an arrival direction of sound at the listener, confirm that the initial sound path travels through each of the one or more intercepted portals.

Another example can include any of the above and/or below examples where the computer-readable instructions, when executed by the processor, cause the system to filter the portals in the virtual scene to exclude portals that do not fall within boundaries of a shape having a size specified by an initial path length of the initial sound path.

Another example can include any of the above and/or below examples where the computer-readable instructions, when executed by the processor, cause the system to perform a first filtering step to exclude one or more first portals outside of a bounding box having a size specified by the initial path length and a location specified by the source location and the listener location.

Another example can include any of the above and/or below examples where the computer-readable instructions, when executed by the processor, cause the system to perform a second filtering step to exclude one or more second portals outside of an ellipsoid having a size specified by the initial path length and foci specified by the source location and the listener location.

Another example can include any of the above and/or below examples where the computer-readable instructions, when executed by the processor, cause the system to receive portal state information for each of the one or more intercepted portals, the portal state information reflecting an extent to which individual intercepted portals are open or closed and render at least one of initial sound or reflected sound at the listener location based at least on the portal state information.

Another example can include any of the above and/or below examples where the computer-readable instructions, when executed by the processor, cause the system to render the initial sound by adjusting loudness of the initial sound based at least on accumulated energy loss across the one or more intercepted portals.

Another example can include any of the above and/or below examples where the computer-readable instructions, when executed by the processor, cause the system to render the reflected sound by determining a portion of reflected energy arriving at the listener through the one or more intercepted portals based at least on the portal state information, and adjusting loudness of the reflected sound based at least on the portion of reflected energy.

Another example includes a method comprising obtaining a representation of a scene having a plurality of portals, simulating sound travel in the scene using a plurality of probes deployed in the scene, based at least on the simulating, determining precomputed acoustic parameters for initial sound traveling between various locations in the scene, and using particular acoustic parameters for a particular source location and a particular listener location in the scene, identifying one or more intercepted portals in the scene that are intercepted by a particular initial sound path from the particular source location to the particular listener location.

Another example can include any of the above and/or below examples where the method further comprising determining the particular acoustic parameters by interpolation of corresponding precomputed acoustic parameters for respective probed locations in the scene that are near the particular source location and the particular listener location.

Another example can include any of the above and/or below examples where the particular acoustic parameters include an initial sound delay from the particular source location to the particular listener location, initial sound delays between the particular source location and respective portals in the scene, and initial sound delays between the respective portals and the particular listener location.

Another example can include any of the above and/or below examples where the method further comprises based at least on respective portal states of the one or more intercepted portals, determining loudness of initial sound traveling from the particular source location to the particular listener location through the one or more intercepted portals.

Another example includes a computer-readable medium storing executable instructions which, when executed by a processor, cause the processor to perform acts comprising based at least on precomputed acoustic parameters for a scene, identifying one or more portals in the scene that are intercepted by a sound path from a sound source to a listener in the scene and rendering sound at the listener that accounts for portal state of the one or more portals.

Another example includes a method comprising based at least on precomputed acoustic parameters for a scene, identifying one or more intercepted portals in the scene that are intercepted by a sound path from a particular sound source location to a particular listener location in the scene and rendering sound at the particular listener location that accounts for portal state of the one or more intercepted portals.

Another example can include any of the above and/or below examples where the method further comprises receive portal state information for each of the one or more intercepted portals, the portal state information reflecting an extent to which individual intercepted portals are open or closed and render at least one of initial sound or reflected sound at the particular listener location based at least on the portal state information.

Another example can include any of the above and/or below examples where the method further comprises render the initial sound by adjusting loudness of the initial sound based at least on accumulated energy loss across the one or more intercepted portals.

Another example can include any of the above and/or below examples where the method further comprises render the reflected sound by determining a portion of reflected energy arriving at the particular listener location through the one or more intercepted portals based at least on the portal state information, and adjusting loudness of the reflected sound based at least on the portion of reflected energy.

Another example can include any of the above and/or below examples where the method further comprises obtaining a representation of the scene, simulating sound travel in the scene using a plurality of probes deployed in the scene, based at least on the simulating, determining precomputed acoustic parameters for initial sound traveling between various locations in the scene, and using particular acoustic parameters for the particular sound source location and the particular listener location to identify the one or more intercepted portals in the scene that are intercepted by the sound path from the particular sound source location to the particular listener location.

Another example can include any of the above and/or below examples where the method further comprises determining the particular acoustic parameters by interpolation of corresponding precomputed acoustic parameters for respective probed locations in the scene that are near the particular sound source location and the particular listener location.

CONCLUSION

The description relates to modeling acoustic effects in scenes with dynamic portals. The disclosed techniques and components can be used to create accurate and immersive sound renderings for video game and/or virtual reality experiences. The sound renderings can include higher fidelity, more realistic sound than available through other sound modeling and/or rendering methods. Furthermore, the sound renderings can be produced within reasonable processing and/or storage budgets.

The methods described above and below can be performed by the systems and/or devices described above, and/or by other devices and/or systems. The order in which the methods are described is not intended to be construed as a limitation, and any number of the described acts can be combined in any order to implement the methods, or an alternate method(s). Furthermore, the methods can be implemented in any suitable hardware, software, firmware, or combination thereof, such that a device can implement the methods. In one case, the method or methods are stored on computer-readable storage media as a set of computer-readable instructions such that execution by a computing device causes the computing device to perform the method(s).

Although techniques, methods, devices, systems, etc., are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A system, comprising:
a processor; and
storage storing computer-readable instructions which, when executed by the processor, cause the system to:
receive a source location of a sound source in a virtual scene having a plurality of portals;
receive a listener location of a listener in the virtual scene;
identify one or more acoustic parameters corresponding to the source location and the listener location, the one or more acoustic parameters characterizing a delay time of a sound path of sound traveling from the source location to the listener location in the virtual scene;
based at least on the delay time of the sound path, identify one or more intercepted portals in the virtual scene that are intercepted by the sound path; and
output an identification of the one or more intercepted portals.

2. The system of claim 1, wherein the sound path is an initial sound path of initial sound.

3. The system of claim 2, wherein the one or more acoustic parameters include a first acoustic parameter specifying a first initial sound delay from the source location to the listener location.

4. The system of claim 3, wherein the one or more acoustic parameters include one or more second acoustic parameters specifying one or more second initial sound delays between the source location and the one or more intercepted portals.

5. The system of claim 4, wherein the one or more acoustic parameters include one or more third acoustic parameters specifying one or more third initial sound delays between the one or more intercepted portals and the listener location.

6. The system of claim 5, wherein the one or more second acoustic parameters specify the one or more second initial sound delays between the source location and one or more centroids of the one or more intercepted portals, and the one or more third acoustic parameters specify the one or more third initial sound delays between the one or more centroids of one or more intercepted portals and the listener location.

7. The system of claim 6, wherein the computer-readable instructions, when executed by the processor, cause the system to:
select the one or more intercepted portals from the plurality of portals in the virtual scene based at least on a comparison of an initial path length of the initial sound path to other path lengths from the source location to the listener through different portals in the virtual scene.

8. The system of claim 7, wherein the computer-readable instructions, when executed by the processor, cause the system to:
perform a string tightening procedure to account for deviation of the initial sound path from respective centroids of the different portals.

9. The system of claim 2, wherein the computer-readable instructions, when executed by the processor, cause the system to:
using a normal vector for each intercepted portal and an arrival direction of sound at the listener, confirm that the initial sound path travels through each of the one or more intercepted portals.

10. The system of claim 2, wherein the computer-readable instructions, when executed by the processor, cause the system to:
filter the portals in the virtual scene to exclude portals that do not fall within boundaries of a shape having a size specified by an initial path length of the initial sound path.

11. The system of claim 10, wherein the computer-readable instructions, when executed by the processor, cause the system to:
perform a first filtering step to exclude one or more first portals outside of a bounding box having a size specified by the initial path length and a location specified by the source location and the listener location.

12. The system of claim 11, wherein the computer-readable instructions, when executed by the processor, cause the system to:
perform a second filtering step to exclude one or more second portals outside of an ellipsoid having a size specified by the initial path length and foci specified by the source location and the listener location.

13. The system of claim 2, wherein the computer-readable instructions, when executed by the processor, cause the system to:
receive portal state information for each of the one or more intercepted portals, the portal state information reflecting an extent to which individual intercepted portals are open or closed; and
render at least one of initial sound or reflected sound at the listener location based at least on the portal state information.

14. The system of claim 13, wherein the computer-readable instructions, when executed by the processor, cause the system to:
render the initial sound by adjusting loudness of the initial sound based at least on accumulated energy loss across the one or more intercepted portals.

15. The system of claim 14, wherein the computer-readable instructions, when executed by the processor, cause the system to:
render the reflected sound by determining a portion of reflected energy arriving at the listener through the one or more intercepted portals based at least on the portal state information, and adjusting loudness of the reflected sound based at least on the portion of reflected energy.

16. A method comprising:
obtaining a representation of a scene having a plurality of portals;
simulating sound travel in the scene using a plurality of probes deployed in the scene;

based at least on the simulating, determining precomputed acoustic parameters for delay times of initial sound traveling between various locations in the scene; and using one or more particular acoustic parameters characterizing a particular delay time of initial sound traveling on a particular initial sound path from a particular source location to a particular listener location in the scene, identifying one or more intercepted portals in the scene that are intercepted by the particular initial sound path.

17. The method of claim 16, further comprising:

determining the one or more particular acoustic parameters by interpolation of corresponding precomputed acoustic parameters for respective probed locations in the scene that are near the particular source location and the particular listener location.

18. The method of claim 17, wherein the one or more particular acoustic parameters include an initial sound delay from the particular source location to the particular listener location, initial sound delays between the particular source location and respective portals in the scene, and initial sound delays between the respective portals and the particular listener location.

19. The method of claim 16, further comprising:

based at least on respective portal states of the one or more intercepted portals, determining loudness of initial sound traveling from the particular source location to the particular listener location through the one or more intercepted portals.

20. A computer-readable medium storing executable instructions which, when executed by a processor, cause the processor to perform acts comprising:

based at least on precomputed acoustic parameters characterizing delay of sound traveling within a scene, identifying one or more portals in the scene that are intercepted by a sound path from a sound source to a listener in the scene; and rendering sound at the listener that accounts for portal state of the one or more portals.

* * * * *